United States Patent [19]

Campbell et al.

[11] Patent Number: 5,182,687
[45] Date of Patent: Jan. 26, 1993

[54] METHOD AND APPARATUS FOR ALIGNING CARTRIDGES WITH A CARTRIDGE INSERTION SLOT

[75] Inventors: Kenneth C. Campbell, Orange, Calif.; Roger M. Gray; Barry C. Kockler, both of Lewisville, Tex.

[73] Assignee: Archive Corporation, Costa Mesa, Calif.

[21] Appl. No.: 510,548

[22] Filed: Apr. 18, 1990

Related U.S. Application Data

[63] Continuation-in-part of Ser. No. 434,036, Nov. 9, 1989, Pat. No. 5,050,020.

[51] Int. Cl.$^5$ .................... G11B 15/68; G11B 17/22
[52] U.S. Cl. ............................. 360/92; 360/71; 369/34
[58] Field of Search ................... 360/69, 71, 92; 369/34-39

[56] References Cited

U.S. PATENT DOCUMENTS

| | | |
|---|---|---|
| 3,453,397 | 7/1969 | Miller et al. |
| 3,817,607 | 6/1974 | Anderson ............................. 360/92 |
| 3,860,964 | 1/1975 | Kozu et al. .......................... 360/92 |
| 4,133,013 | 1/1979 | Fisher ................................... 360/92 |
| 4,561,078 | 12/1985 | Nakayama ........................... 369/38 |
| 4,635,150 | 1/1987 | Kato et al. ........................... 360/92 |
| 4,652,939 | 3/1987 | Baumeister ......................... 369/38 |
| 4,697,215 | 9/1987 | Hata ..................................... 360/95 |
| 4,835,634 | 5/1989 | Ostwald. |
| 4,839,758 | 6/1989 | Honjoh ............................. 360/99.06 |
| 4,860,133 | 8/1989 | Barasnski. |
| 4,918,548 | 4/1990 | O'Donnell et al. |
| 4,954,915 | 9/1990 | Koda et al. ......................... 360/92 |
| 4,993,010 | 2/1991 | Kishimura et al. ................ 369/36 |
| 5,021,902 | 6/1991 | Ishikawa et al. ................... 360/92 |
| 5,029,024 | 7/1991 | Leonard et al. ................... 360/92 |
| 5,045,958 | 9/1991 | Leonard et al. ................... 360/92 |

OTHER PUBLICATIONS

Summas TM Computer Systems, Form No. 30208, Feb. 1989.
"DAT Stackers—Automated Media Comes of Age," Data Concepts News, Oct. 1989.

Primary Examiner—Aristotelis Psitos
Assistant Examiner—Jefferson Evans
Attorney, Agent, or Firm—Knobbe, Martens Olson & Bear

[57] ABSTRACT

The present invention provides an automated cartridge loader 10 of novel design for use with a cartridge drive 12. In accordance with one aspect of the present invention, there is provided a sequentially loading cartridge loader 10 which allows the unattended storage of gigabytes of data. The loaders are adapted to be attached to a cartridge drive 12. The novel loaders of the present invention may comprise three moving components: the magazine 30, the pusher 91, and the gripper 93. Each moving component has its own drive motor 80, 94, 146. The magazine 30 has a plurality of slots 40 for holding cartridges 38 which are loaded into a cartridge drive 12. The pusher 91 of the present invention is aligned with the cartridge drive 12 and pushes the cartridges 38 into the cartridge drive 12. The gripper 93 closes on a cartridge 38 after it is ejected from the cartridge drive 12 and holds the cartridge 38 as the pusher 91 moves back to pull the cartridge 38 back into its slot 40 in the magazine 30. There is additionally provided a method of sequentially loading cartridges 38 into a cartridge drive 12 using the novel cartridge loader 10.

13 Claims, 15 Drawing Sheets

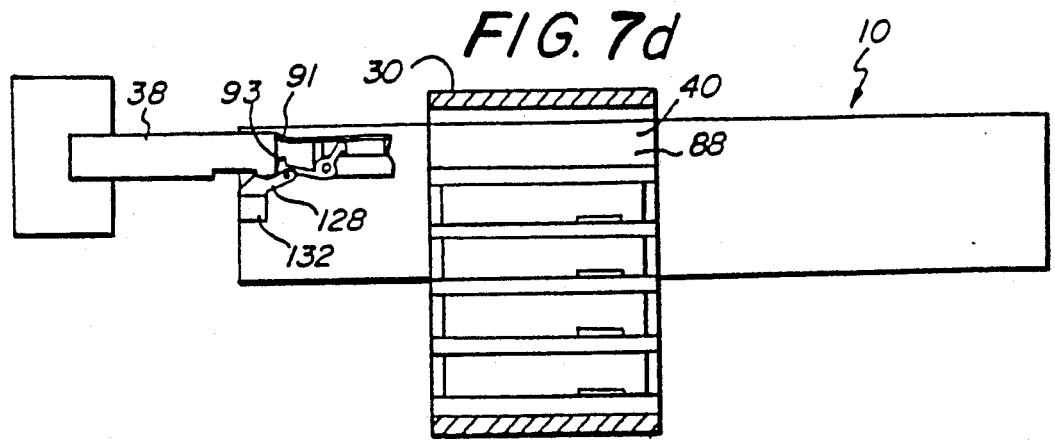
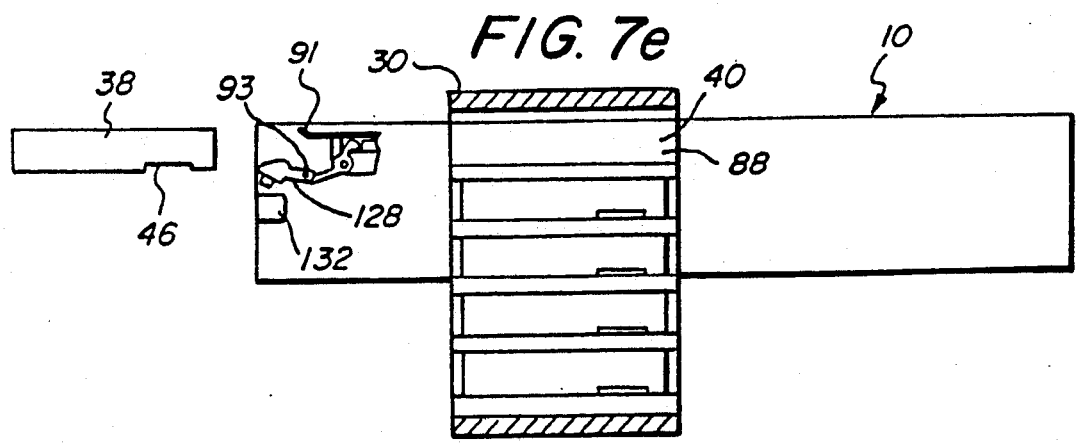
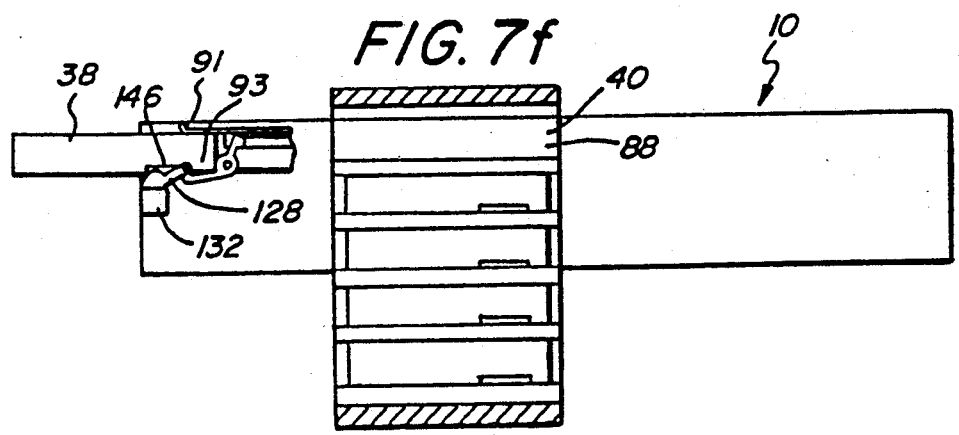

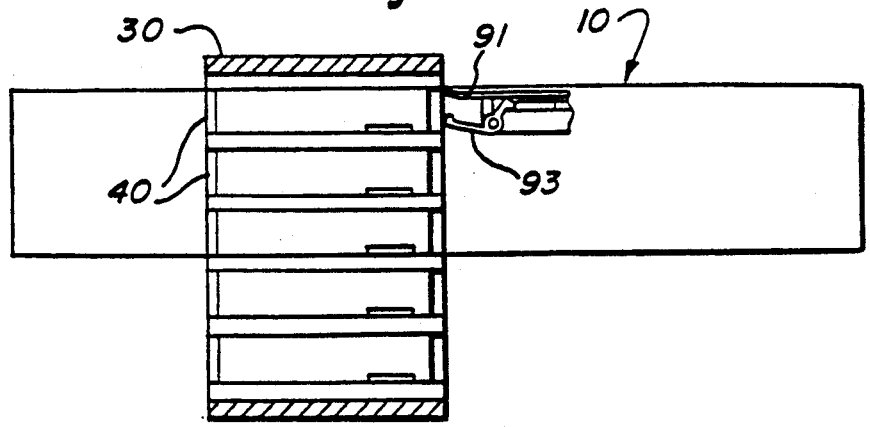
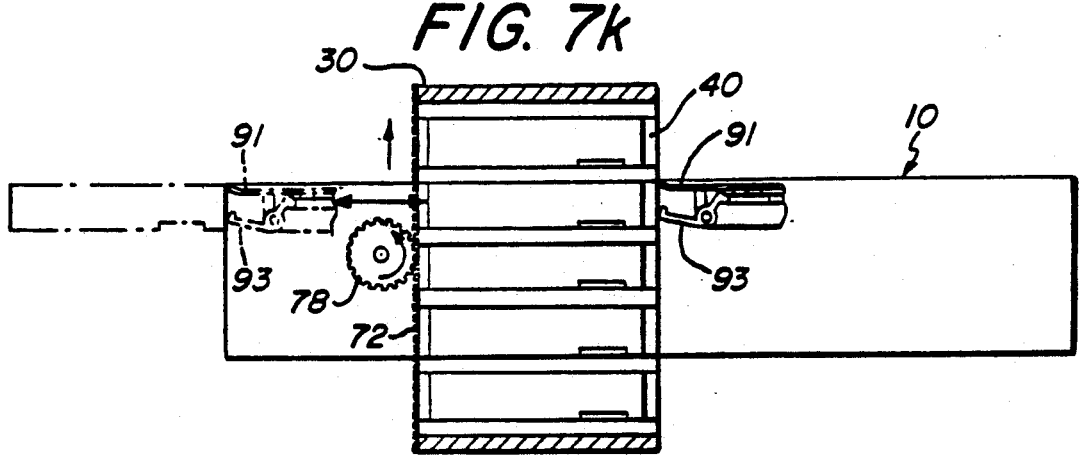
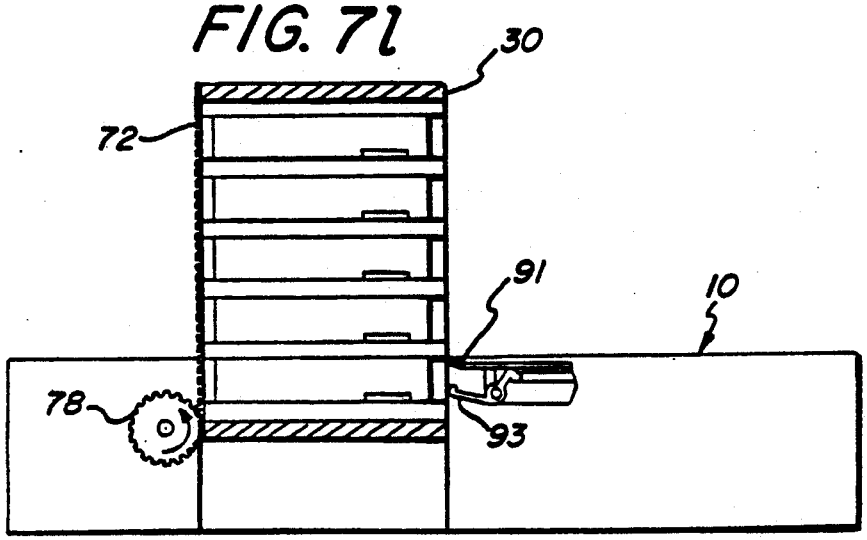

METHOD AND APPARATUS FOR ALIGNING CARTRIDGES WITH A CARTRIDGE INSERTION SLOT

RELATED APPLICATIONS

This is a continuation in part of parent U.S. patent application, Ser. No. 434,036, filed Nov. 9, 1989, inventors Campbell et al., and, entitled "Cartridge Loader," now U.S. Pat. No. 5,050,020.

BACKGROUND OF THE INVENTION

Field of the Invention

The present invention relates generally to the field of cartridge loaders. More specifically, the present invention relates to loaders which sequentially load each of a plurality of cartridges into a cartridge drive.

Description of the Related Art

Most personal and small business computers were originally designed for the use of flexible or floppy disk memories. Devices for the unattended sequential loading of floppy disks have been developed for a variety of uses. These devices generally include a hopper wherein the disks are stacked for loading into a disk drive. Generally, these devices have been used for making multiple copies of the same program. The use of these devices for storage of large amounts of data on disks has generally proven unsatisfactory due to the large number of disks involved and the difficulty in retrieving data from them.

To ensure the interchangeability of flexible disk and other drives, an industry standard has been established which requires that these drives be constructed so that they fit within a "full height form factor" (of approximately 3¼ inches (8.3 cm) in height by 5¾ inches (14.6 cm) in width by 8 inches (20.3 cm) in length) or a "half height form factor" (of approximately 1⅝ inches (4.1 cm) in height by 5¾ inches (14.6 cm) in width by 8 inches (20.3 cm) in length).

The 5¼ inch (13.3 cm) tape drive has achieved great popularity for backing up the data of a personal or small business computer, due to its high storage capacity and rapid data access capability. However, more recently, R-DAT drives have been developed which store much more data with an even more rapid data access capability. Most users prefer internal drives. The increasing standardization of the computer industry requires that these internal R-DAT drives, like all drives, fit within the full or half height form factor described above.

A standard R-DAT tape may hold up to 1.3 gigabytes of data. However, many applications, including archival storage, journaling, online and background storage, and the unattended back-up of large amounts of data, may require storage of several times that amount of data. When backing up a data source of more than 1.3 gigabytes, it is necessary to change the R-DAT tape in a R-DAT cartridge drive approximately every two hours. Since most such backing up is done outside of normal work hours to avoid tying up the computer holding the data, it is often not convenient to change the R-DAT tape. Thus, there is a need for a cartridge loader capable of holding a plurality of R-DAT cartridges for loading sequentially into a R-DAT cartridge drive.

Many computer systems include a plurality of memory storage drives. Indeed, the half height form factor drives are often stacked one on top of the other. Access to all of these drives must be preserved when any accessory, including a cartridge loader, is added to the computer. In order for a cartridge loader to be used most conveniently, it would be desireable to obviate the need to attach and detach the loader for each use. An attached loader which does not block access would need to be adapted to fit within the small 1⅝ by 5¾ inch (4.1 by 14.6 cm) space of the front of the half height form factor. Thus, there is a need for a loader adapted to fit within that space.

Devices for loading and unloading cartridges have been developed. However, many of these devices are adapted for use only with certain low storage capability cartridges, such as standard audio cassettes. Moreover, many of these devices are quite large and expensive. Many users do not require such large devices, and cannot afford to pay for them. Other loading/unloading devices include an external cartridge drive, resulting in less consumer satisfaction due to their preferences for internal drives and the greater size and expense of the external drives. Many of the devices require an electrical or logical interface with the host computer. The interface requirement restricts the use of the devices to systems for which interfaces have been developed. Thus, there is a need for a small, relatively inexpensive cartridge loader which loads cartridges into an internal tape drive and does not require an electrical interface with the computer to be loaded.

Recently, Predator Systems Corporation announced the development of the Data Hawk I, a 4 mm DAT stacker holding eight DAT cartridges for loading and unloading to a 4 mm DAT cartridge drive. The Data Hawk I has a load/unload cycle time of over 15 seconds and has an anticipated end user price of approximately $4000. The long cycle time and relatively high price of the device may prove unacceptable to many users. Thus, there remains a need for an inexpensive automated cartridge loader with a short load/unload cycle.

SUMMARY OF THE INVENTION

The present invention comprises a loader for a drive having a cartridge acceptor, including a housing defining an opening, a holder, an assembly for aligning the holder, and a pusher supported by the housing. The holder is mounted within the opening and at least partially defines a plurality of spaces. Each of the spaces is sized and shaped to receive a cartridge. The holder includes supports for supporting a cartridge within each of the spaces. The assembly selectably aligns each of the spaces of the holder with the cartridge acceptor of the drive. The pusher is supported by the housing and pushes a cartridge positioned within one of the spaces to the acceptor of the drive so that the acceptor accepts the cassette.

In the preferred embodiment, the loader further comprises a gripper for gripping a cartridge. Upon the ejection of the cartridge from the drive, the gripper grips the cartridge and is pulled back by the pusher, thereby positioning the cartridge within one of the plurality of spaces.

Another aspect of the present invention is a method of moving a cartridge magazine to a specific location so that a cartridge is aligned with the slot of a tape drive. The method comprises the steps of providing a first flag that is proximate to a flag sensor to indicate when a first cartridge is aligned with the slot of the tape drive, and providing a second flag that is proximate to the flag sensor to indicate when a second cartridge is aligned with the slot of the tape drive. A motor is enabled in a first direction to move the magazine from a first position, where the first flag is proximate to the flag sensor, to a second position where the second flag is proximate to the flag sensor. The method includes the steps of measuring the amount of time required to move the magazine between the first and second positions and using the measured amount of time to determine the width of a brake pulse to apply to the motor to stop the magazine with the second flag proximate to the flag sensor so that the second cartridge is aligned with the slot of the tape drive. The brake pulse is applied to the motor.

In preferred embodiments of the method, the step of using the measured amount of time to determine the width of a brake pulse comprises applying a digital value, corresponding to the measured amount of time, to a look-up table. The look-up table comprises a brake pulse width for each applied digital value. Preferably, the step of applying the brake pulse comprises the step of enabling the motor in a second direction opposite the first direction until the motor stops turning in the first direction, and disabling the motor before the motor starts to turn in the second direction.

BRIEF DESCRIPTION OF THE DRAWINGS

FIGS. 7a-7l are schematic representations of the operation of a cartridge in accordance with a preferred embodiment of the present invention.

DETAILED DESCRIPTION OF THE PREFERRED EMBODIMENT

Figure 1:
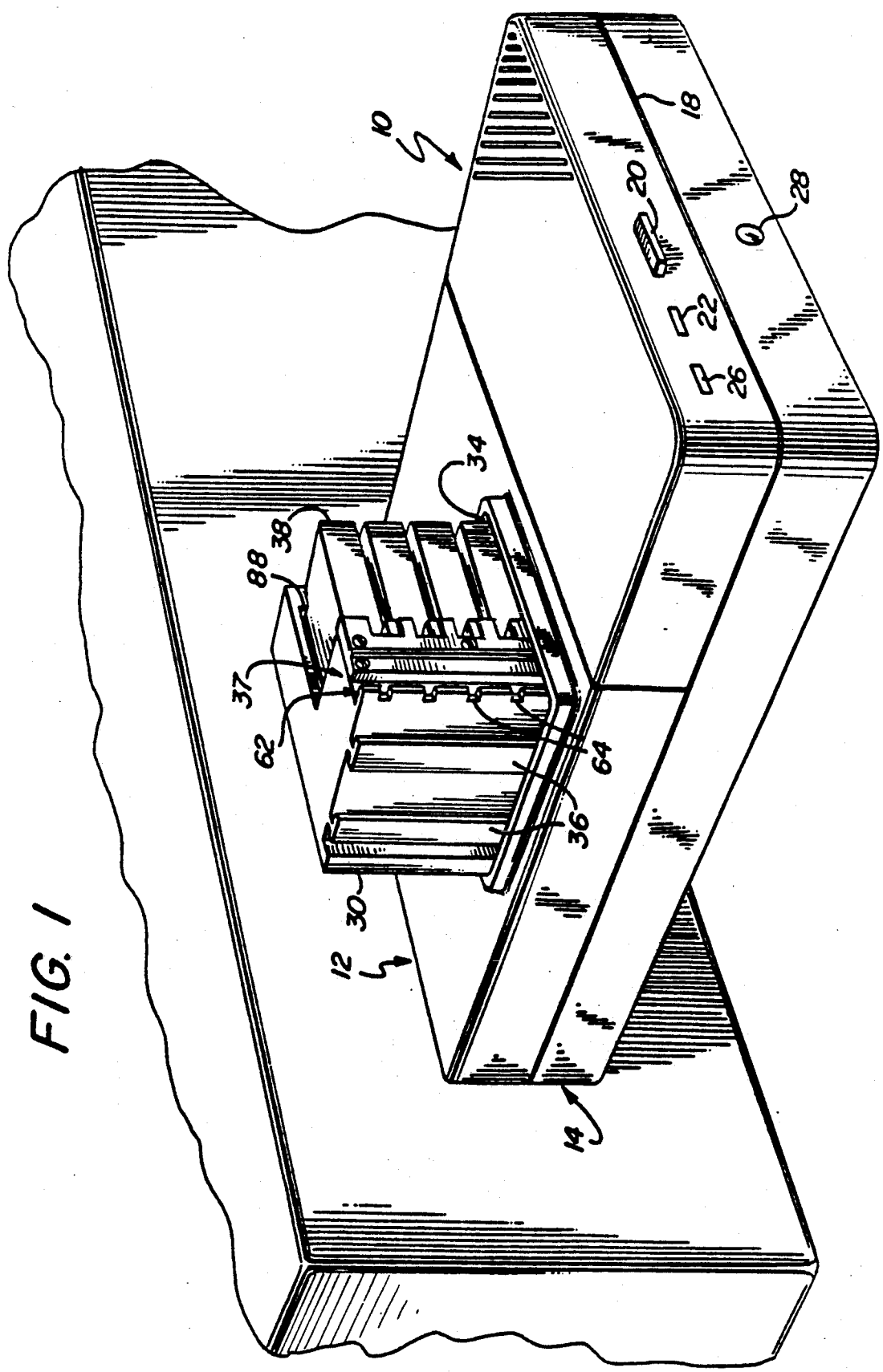
FIG. 1 is a perspective view of a cartridge loader including a magazine attached to a computer tape drive in accordance with one embodiment of the present invention.

Referring now to the drawings in detail, wherein like reference numerals designate like elements throughout the several views and representations thereof, there is shown generally at 10 in FIG. 1, a cartridge loader embodying the present invention in a preferred form. Advantageously, the loader of this embodiment is compatible with the internal configuration of the Archive Python ("Archive" and "Python" are trademarks of Archive Corporation of Costa Mesa, Calif.) R-DAT tape drive 12. However, the loader shown by this embodiment of the invention may be adapted to any front loading R-DAT tape drive compatible with a full or half height form factor which incorporates a standard cartridge acceptor (i.e., a mechanism for accepting the cassette for engagement of the cassette with the read/write head of the drive). Furthermore, those skilled in the art will appreciate that the advantages of this drive are not limited in application by a particular form factor.

The R-DAT tapes are also adapted to digitally record and play back audio materials. Consumers have in the past expressed a preference for audio components which are capable of playing a plurality of recordings, as seen by the one-time popularity of LP changers and the current popularity of CD changers. Accordingly, the loader may be adapted to attach to a front loading R-DAT audio component.

Preferably, the loader has a generally rectangular box-shaped housing 11. When the embodiment shown in FIG. 1 is mounted, the front bezel (not shown) of the tape drive is removed. The rear 14 of the loader is adapted to mount in the place of the removed front bezel. The rear of the loader is the side of the loader which mounts to the drive 12 and the front of the loader is the side of the loader away from the drive 12. In the preferred embodiment, the functions of the operator panel of the tape drive are incorporated into the front panel 18 of the loader. These features include an eject button 20, a drive status LED 22, and a cassette status LED 26. The eject button 20 will be pressed when it is desired to remove a holder, for example, a five-cartridge magazine 30, from the loader. The LEDs may be of any color, and preferably, have a 40 degree angle and are 50-100 mcd. As an optional feature, an audio jack 28 may also be provided as an output for connecting the drive 12 with a device to transform the digital output of the drive to analog for playback of recorded audio materials.

Advantageously, all of the components of the loader 10, except for the magazine 30, fit within the 1⅝ by 5¾ inch (4.1 by 14.6 cm) space of the half height form factor. Thus, the mounted loader 10 will not interfere with access to other internal drives of the computer to which the loader is mounted.

Preferably, the loader is mounted to a drive which is more than 1⅝ inches (4.1 cm) above the table top. This distance is required to allow translation of the five cartridge-magazine 30 in the vertical plane without hitting the table top. Advantageously, this distance above the table top is achieved when the loader 10 is mounted to the upper drive of two standard half height form factor internal drives stacked one above the other.

The drive 12 and loader 10 combination, may be mounted in any of three positions, including horizontally as shown, or with either the left or right side facing upward.

Figure 3:
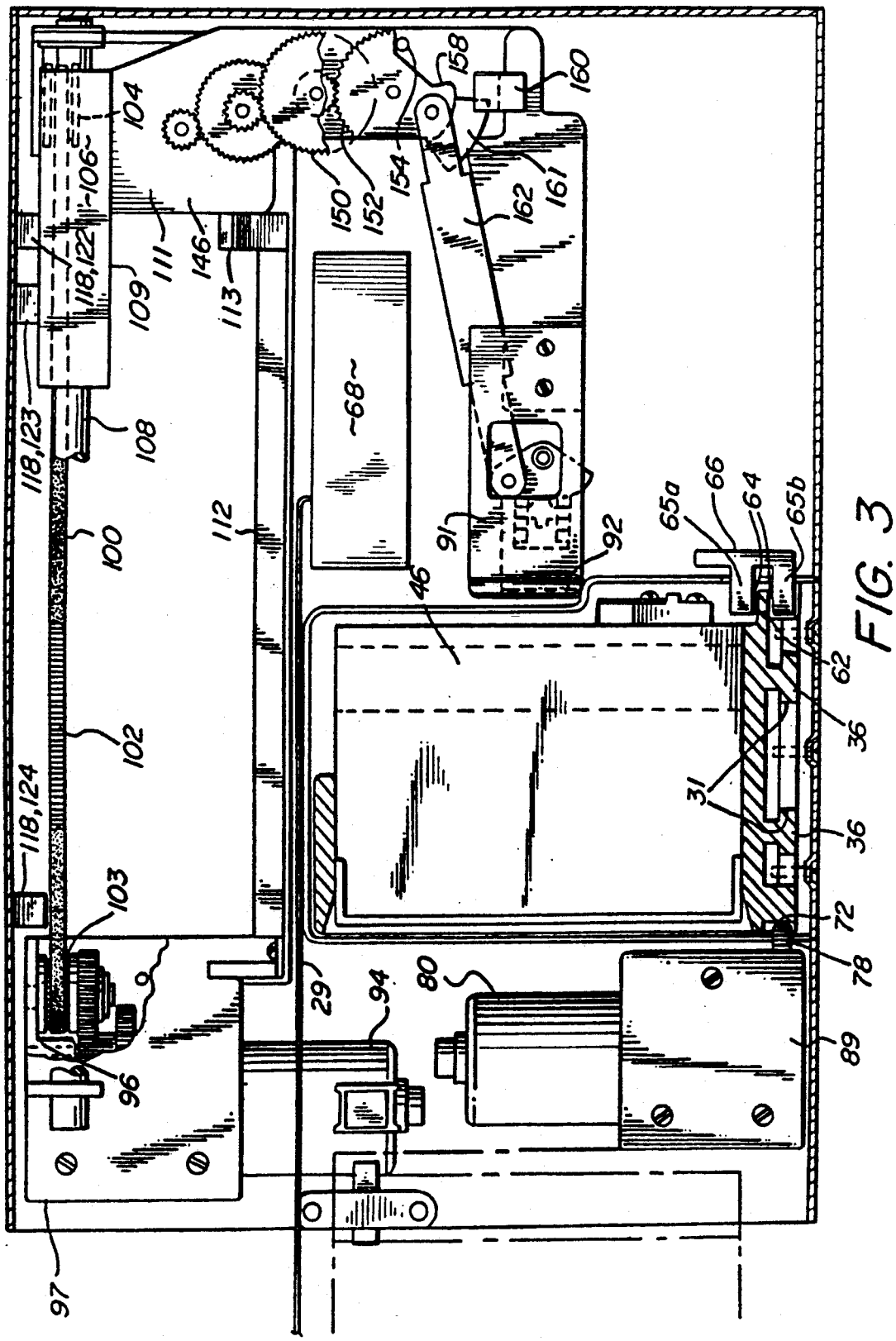
FIG. 3 is a top sectional view of the cartridge loader of FIG. 1, including a magazine; also showing a cartridge, in phantom, partially ejected from the loader.

The loader 10 does not require any electrical interface or any logical connection with the host computer system. The loader 10 can, therefore, operate in any software environment. However, in the preferred embodiment, the loader 10 obtains its power from the host computer system power supply. As seen in FIG. 3, the connection to the system power may be obtained through a pigtail cable 29 from the loader which may, advantageously, be routed internally through the cartridge drive 12. Alternatively, power may be obtained from an external power supply.

In the preferred embodiment, the standard magazine 30 of the loader has a capacity of five R-DAT cartridges. When the loader is mounted to a tape drive 12 in accordance with a preferred embodiment, the standard magazine 30, advantageously, will not hit the table during its translation when the drive/loader combination is mounted in the horizontal plane. The standard magazine's capacity of five cartridges enables the drive to store 6.5 gigabytes of data, unattended by an operator, over a ten hour period. Thus, the entire operation can occur during non-working hours, leaving the host computer and drive free for use during working hours. Advantageously, unattended operation of the loader occurs due to the automatic ejection of each cartridge by the drive 12 after it is fully recorded or read, followed by the operation of the loader 10. Magazines with capacities greater or fewer than five may also be accommodated. However, magazines with greater than five cartridge capacity may not be compatible with certain horizontal mount configurations.

Figure 2:
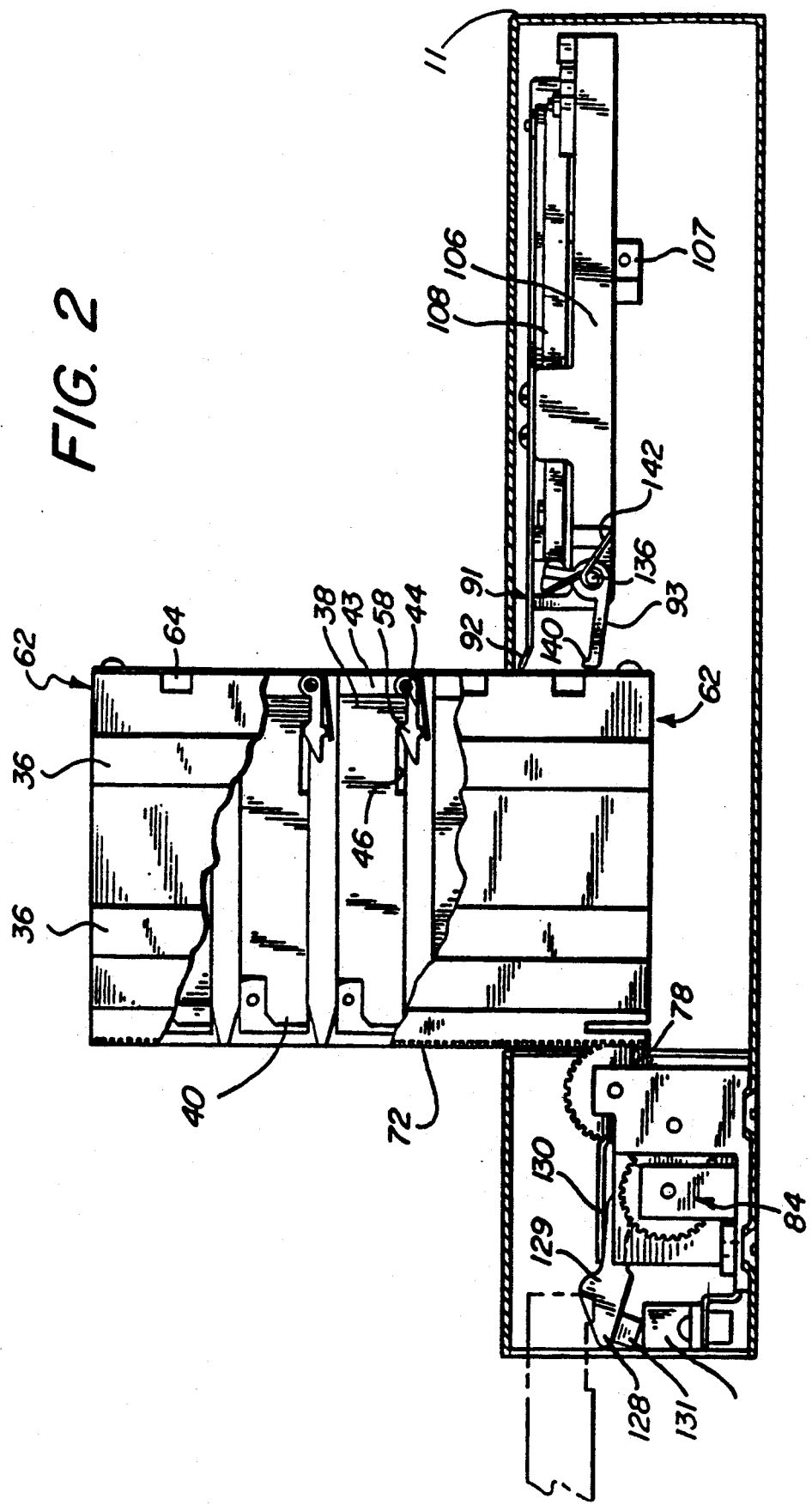
FIG. 2 is a left sectional view of the cartridge loader of FIG. 1, including a partially cut away view of a magazine, showing the magazine slots; also showing a cartridge, in phantom, partially ejected from the loader.

As shown in FIGS. 1 and 2, the magazine 30 may be constructed of rigid molded plastic, or of any other suitable material. The magazine 30 is inserted into the loader 10 through a magazine opening 34 which is a substantially rectangular opening extending vertically through the entire loader. Preferably, the opening 34 defines one or more vertically aligned T-shaped channels 31 along one side. The channels 31 may be formed by plates extending the height of the magazine opening 34, but having different widths and being stacked one on top of each other. The channels are sized and shaped to slidably receive one or more vertically extending guides 36, of T-shaped cross section, which extend along one side of the magazine 30. In the preferred embodiment shown, there are two T-shaped guides 36 and two mating channels 31.

The magazine 30 is supported in a cantilever manner by the housing 11 within the opening 34 in that the magazine's only connection with the housing 11 is along the side of the opening 34 nearest to the wall of the housing 11. Advantageously, the cantilevered design allows the magazine to be driven without excess friction and without devoting excess space to the mounting of the magazine 30. Moreover, the cantilevered design allows the magazine to move freely along the unattached side thereby preventing that side from sticking. Preferably, one of the T-shaped guides 36 fits into its channel 31 more tightly than the other. This arrangement prevents the magazine from being moved more rapidly along one of the channels 31 than the other and causing the magazine 30 to snag during vertical movement.

As best seen in FIG. 2, the magazine 30 defines a plurality of slots or spaces 40 each of which is capable of holding one cartridge 38. The standard magazine of the preferred embodiment described above, therefore, would have five slots 40. The slots 40 are only slightly wider than the width of the cartridges 38, so as to minimize the size of the magazine 30 and to prevent excess sideways motion of the cartridges 38. The slots 40 present a full profile to the rear of the magazine 30. However, in the preferred embodiment, the slots 40 are generally L-shaped in that they are not as wide as the magazine beyond about one inch (2.5 cm) from the rear of the magazine 30. This lowers the weight of the magazine 30 and helps prevent jamming of the cartridge 38 within the slot 40.

Along the front of the magazine, opposite the drive, is a retaining block 37 for preventing the cartridges 38 from being pushed beyond the rear end of the magazine 30. The retaining block 37 may be only a fraction of the length of the front of the magazine 30, as shown, or it may extend across the entire back of the magazine 30. In the preferred embodiment, the retaining block contains a sheet metal plate with tabs 39 bent down into the magazine slot 40 into which the cartridges 38 fit. Cartridge retainers 44 are provided to hold the cartridges 38 in each slot. The tabs 39 serve to provide tension for the cartridge retainers 44 by being bent slightly less than that required to allow the cartridge retainers 44 to fully accommodate the cartridge without being depressed. The cartridge retainers 44 may be small shafts with triangular tips which will engage the depression 46 found in the front of the standard R-DAT cartridge 38, thereby retaining the cartridges in their respective slots 40. However, the tension of the cartridge retainers 44 is not so great that it prevents the cartridge 38 from being pushed out of the slot 40 if sufficient force is applied from the front.

When the cartridge 38 is inserted into the magazine slot 40, the cartridge retainer 44 in the slot 40 holds the cartridge 38 securely within the slot 40. The tabs 39 may be located anywhere along the front of the slot 38, however, preferably it is closer to the side of the magazine with the T-shaped guides 36.

Referring to FIGS. 2 and 3, along one corner of the front of the magazine 30, is a vertical flange or strip of opaque material 62, which may be formed of the same material as the magazine 30. The strip 62 includes cut outs 64 at various positions along its length corresponding to each slot 40. The cut outs 64 serve as flags for an electrical magazine sensor 65 which may advantageously be placed within a generally C-shaped magazine guide 66, as best seen in FIG. 3. The sensor may comprise a LED emitter 65a and a light sensing detector 65b, or may comprise any other type sensor known by one of skill in the art. The sensor 65 is in electrical connection with a microprocessor board 68, shown in FIG. 3, where the signal is processed.

The magazine is aligned with the acceptor of the drive by means of a linear displacement assembly mounted within the front corner of the loader proximate the channels 31. As shown in FIGS. 2 and 3, in the preferred embodiment, the assembly comprises a motorized gear train 84, positioned in the rear corner of the loader and a train engaging device, such as a rack 72, positioned along the corner of the front side of the magazine 30 proximate the T-shaped guides 36. The grooves of the rack 72 are meshingly engaged by the last gear 78 of the gear train 84. The train 84 includes and is driven by a magazine drive motor 80, as best seen in FIG. 3. The magazine drive motor powers the gear train 84 with a relatively high final drive ratio, approximately 65:1 in the preferred embodiment, in order to move the magazine 30 with relative precision. The high gear ratio also allows the motor 80 to reach its full speed quickly and to operate with less strain. In the preferred embodiment, the high gear ratio allows the motor 80 to operate at virtually no-load speed.

When the magazine 30 is inserted into the magazine opening 34, the flow of light through the magazine sensor 65 is interrupted by the opaque strip 62. This interruption serves as a signal to the magazine drive circuity 79 to start the magazine drive motor 80, the rotation of which drives the gear train 84, causing the clockwise rotation (as seen in FIG. 2) of the last gear 78 and moving the magazine 30 downward so that the uppermost, or first cartridge slot 88, is aligned with the acceptor of the drive. Advantageously, conventional drive motor circuits may be used to operate all of the motors of the present invention.

Preferably, the gear train 84 is protected by a gear plate 89 positioned above the gear train 84, to ensure that the gears are not damaged during operation of the cartridge loader 10 when a cartridge 38 is pushed directly over the gear train 84.

Advantageously, a short delay, preferably less than one second, occurs after the insertion of the magazine 30 in order to allow an operator time to position the magazine rack 72 in meshing engagement with the last gear 78 and remove his or her hand before the magazine drive motor 80 begins movement. This delay may be achieved through the provision of a microprocessor chip within the magazine drive circuit 79. In the preferred embodiment, the total time from insertion of the magazine until the magazine is positioned at the first cartridge slot 88 is approximately 5 seconds. The magazine motor 80 runs open loop until a brake pulse is applied. The timing and width of these brake pulses are described below.

In the preferred embodiment, after the magazine drive motor circuitry 79 is signaled by the magazine sensor 65 to begin moving the magazine drive motor 80, movement of the magazine 30 continues until the sensor encounters all but one of the flags 64. As each flag 64 is passed, the flow of light through the sensor 64 will be unblocked as a signal that a magazine slot 40 has been passed. The signal that a slot 40 has been passed is stored in a non-volatile memory device 90, designated as "ROM" in FIG. 6, so that a record is always stored of the position of the magazine. The memory device 90 counts the number of flags 64 encountered. When the trailing edge (i.e. the edge which passes through the sensor 65 after the flag 64 passes) of the penultimate flag 64 corresponding to the second slot (i.e., the slot immediately below the first slot 88) is encountered by the sensor 65, a timer, advantageously provided as part of the programming of the magazine drive circuit 79, is enabled to measure the time between flags. The motor 80 continues moving the magazine 30 until the leading edge (i.e. the edge which passes through the sensor 65 before the flag 64 passes) of the last flag 64, corresponding to the first slot 88, is found by the sensor 65. When the magazine 30 is at this position, a braking pulse is applied to the motor 80 to accurately stop the motor, with the cartridge 38 in the first slot 88 aligned in the same plane as the acceptor of the cartridge drive 12. When the width of the braking pulse is determined according to the method of the present invention which is described below, the first slot 88 of the magazine 30 will be vertically aligned with the acceptor 12 with the flag 64 approximately in the center of the sensor 65. While in the preferred embodiment, the first cartridge 38 to be loaded is the cartridge 38 in the slot 88 corresponding to the last flag, those skilled in the art will recognize that the loader could operate so that the first cartridge 38 to be loaded is the cartridge 38 in the slot 40 corresponding to the first flag 64.

It is desirable to accurately stop the magazine 30 with the slot 40 in the same plane as the cartridge drive 12, because variations greater than ±1 mm could prevent the cartridge 38 located in the slot 40 from being accepted by the drive 12. Accordingly, the height of the flag 64 is approximately 2 mm, so that as long as the magazine 30 stops with the sensor 65 over the flag 64, the cartridge 38 will be aligned with the drive 12. Different amounts of force are required to stop the motor depending on the orientation of the loader 10 and drive 12 combination and depending on the number of cartridges present in the magazine. Accordingly, in the preferred embodiment, the width of the braking pulse is varied in order to accurately stop the magazine 30.

Figure 8A:
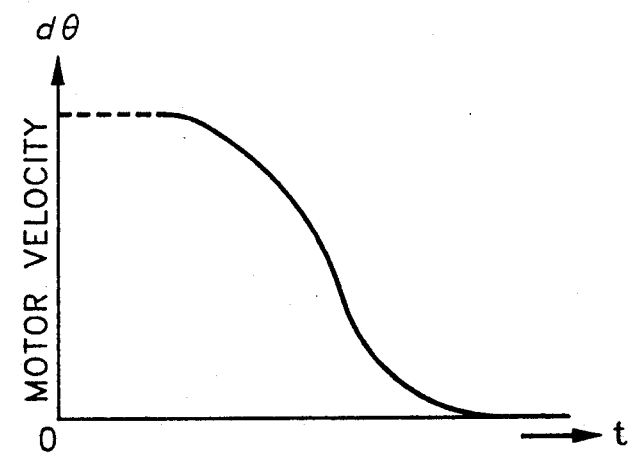
FIGS. 8a, 8b and 8c are graphs of the velocity of the magazine versus time, the acceleration of the magazine versus time and the polarity of the voltage applied to the magazine motor versus time, respectively, to illustrate the effect of a brake pulse on the magazine motor.
Figure 8B:
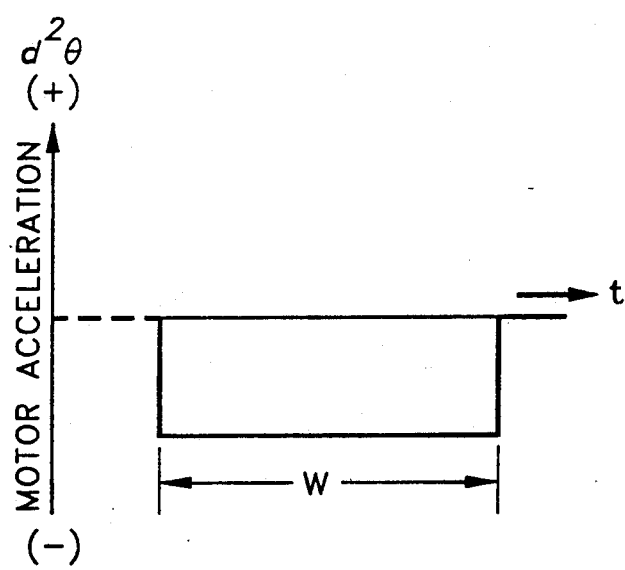
Figure 8C:
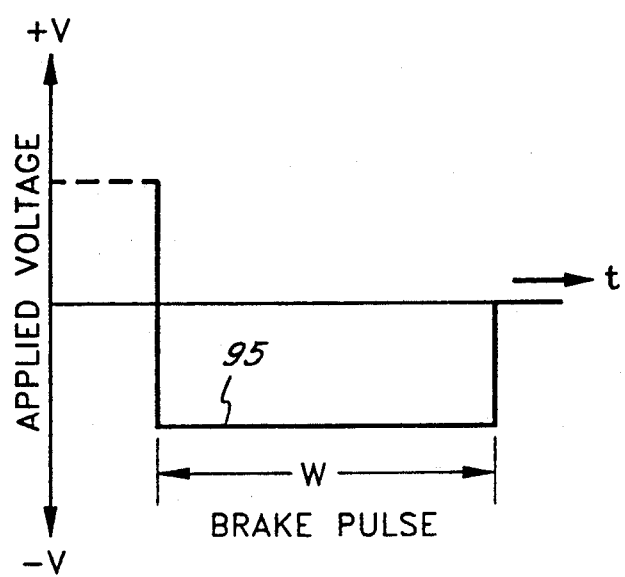

The present invention advantageously provides a method of determining the width, or time duration, of the brake pulse which will accurately stop the movement of a loaded motor. FIG. 8a illustrates a graph of the velocity (d$\theta$) versus time and FIG. 8b illustrates a graph of the acceleration (d$^2\theta$) versus time. FIG. 8c represents a graph of the voltage applied to the magazine motor 80 to produce the velocity and acceleration effects illustrated in FIGS. 8a and 8b. The voltage is positive when the motor 80 is rotating to move the carriage 30 in a first direction. The voltage is negative when the motor 80 is to be stopped. The amount of time when the voltage is negative generates the brake pulse which is designated as 95 in FIG. 8c. The brake pulse 95 has a time duration or width W which is determined in accordance with the present invention, as will be described below.

In FIG. 8b, the acceleration of the motor is positive if the motor velocity is increasing, and is negative if the motor velocity is decreasing (i.e., deceleration). FIGS. 8a and 8b represent the effect of the brake pulse 95 (FIG. 8c) on the velocity d$\theta$ and the acceleration d$^2\theta$ when the motor is travelling at a constant velocity and is stopped by the brake pulse 95. The effect of the brake pulse 95 is represented by the negative acceleration d$^2\theta$, also having a time duration W, and a decrease in the velocity d$\theta$ from its initial forward velocity to a velocity substantially equal to zero. The width W of the brake pulse 95 is selected so that the deceleration terminates when the velocity is substantially zero so that the motor 80 does not start turning in the opposite direction.

The width 95 of the brake pulse can be calculated from equation (1), a basic equation of motion:

$$d\theta = d\theta_o + (d^2\theta)t \tag{1}$$

where d$\theta_o$=initial velocity. For a motor brought to rest by a brake pulse of duration $t_{brake}$, d$\theta$ will be zero. Therefore the brake pulse ($t_{brake}$) 95 can be calculated as:

$$t_{brake} = d\theta_o / d^2\theta. \tag{2}$$

FIG. 8c shows the applied voltage to a bidirectional dynamic motor immediately before, during and after the brake pulse 95. It can be seen that in the bidirectional dynamic motors of the present invention, deceleration is accomplished by a pulse of voltage applied of opposite polarity to that applied in the direction of movement. Accordingly, an expression of d$^2\theta$ in terms of voltage is required to determine the width 95 of the brake pulse.

The voltage (V) in a D.C. motor can be calculated as:

$$V = IR + \omega K_E \tag{3}$$

where I=current, R=resistance, $\omega$=rotational velocity (rpm), and $K_E$=an EMF constant specific to the motor drive system. (The EMF Constant of a motor is specified by the manufacturer of the motor.) The current (I) can be further defined as:

$$I = T_G/K_T \tag{4}$$

where $T_G$=generated torque and $K_T$=a torque constant specific to the motor drive system (as specified by the motor manufacturer). Therefore, by substituting this expression for current into equation (3), the voltage can be calculated as:

$$V = (T_G/K_T)R + \omega K_E. \tag{5}$$

Solving equation (5) for $T_G$ generates:

$$T_G = (K_T/R)(V - \omega K_E). \tag{6}$$

During deceleration, $\omega K_E$ will be negative, thus, by redefining $\omega K_E$ as an absolute value and carrying out the above multiplication, generated torque may be expressed as:

$$T_G = K_T V/R + K_T K_E \omega/R. \tag{7}$$

It can be seen, therefore, that the torque generated by the motor ($T_G$) can be calculated as a function of the velocity of the motor ($\omega$).

The average velocity of the motor prior to the brake pulse ($\omega_{avg}$) is determined from a measurement obtained of the average velocity of the magazine 30, which is measured by turning on a timer when the trailing edge of the penultimate flag 64 has moved past the sensor 65, and stopping the timer when the leading edge of the last flag 64 passes the sensor 65. The average velocity ($\omega_{avg}$) is determined by dividing the known distance between these two points by the time measured by the timer.

Referring again to FIG. 8a, it can be seen that $d\theta$ decreases during braking. The average velocity, during the brake pulse ($d\theta_{avg}$), therefore, is the average of the velocity at the start of the pulse ($\omega_{avg}$) and at the end of the pulse (zero). Accordingly, $d\theta_{avg}$ can be expressed as:

$$d\theta_{avg} = \omega_{avg}/2. \tag{8}$$

Therefore, by substituting this value for $\omega$ in equation (7), the average generated torque of a motor during braking can be determined as:

$$T_G = K_T V/R + K_T K_E(\omega_{avg})/2R. \tag{9}$$

During dynamic braking of a motor, the torque generated can also be determined as:

$$T_G = (d^2\theta)J - T_f \tag{10}$$

where J=total inertia and $T_f$=frictional torque. The total inertia (J) is made up of an inertia component from the motor and an inertia component from the magazine. Due to the relatively high gear ratio of the motor drive system, the component from the magazine is negligible relative to the component from the motor. Therefore, the total inertia is approximately equal to the inertia specified by the motor manufacturer for the motor. $T_f$ is subtracted when calculating $T_G$ during braking because friction aids the braking process, thus lowering $T_G$. Solving equation (10) for $d^2\theta$ yields:

$$d^2\theta = (T_G + T_f)/J. \tag{11}$$

The friction torque ($T_f$) of a motor can also be determined as a function of $\omega_{avg}$. $T_f$ can be expressed as:

$$T_f = K_T V/R - K_T K_E(\omega_{avg})/R. \tag{12}$$

Substituting the value for $d^2\theta$ from equation (11) into equation (2) for determining the brake pulse gives:

$$t_{brake} = (\omega_{avg})J/(T_G + T_f) \tag{13}$$

since $d\theta_o = \omega_{avg}$.

Finally, substituting the value for generated torque from equation (9) and the value for $T_f$ from equation (12) into equation (13) provides an equation for determining $t_{brake}$, with the only variable being $\omega_{avg}$:

$$t_{brake} = J\omega_{avg}/(2K_T V/R - K_T K_E \omega_{avg}/2R). \tag{14}$$

From equation (14), a look up table can be generated for the brake pulse width to be applied for any $\omega_{avg}$ of the motor. For the Buehler motor of the preferred embodiment, $K_T = 1.93$ ounce-inch/Amp, $K_E = 1.428$ V/krpm, $R = 15.77$ $\Omega$, $J = 4.815$ $(10^{-5})$ ounce-inch-sec$^2$, and $V = 10$ V. Since $\omega_{avg}$ is a function of the time taken for the motor drive system to drive the magazine from the trailing edge of the penultimate flag 64 to the leading edge of the last flag 64, the look-up table can be generated as a function of this time. In the preferred embodiment, the look-up table contains brake pulse values for times at 0.005 second intervals. It has been observed that the time to move the magazine 30 between flags 64 varies from 0.2 to 0.3 seconds. Thus, for the motor of the preferred embodiment, the following look-up table results:

| Time | $T_{brake}$ |
| --- | --- |
| 0.200 sec. | 0.02615 sec. |
| 0.205 | 0.02535 |
| 0.210 | 0.02460 |
| 0.215 | 0.02388 |
| 0.220 | 0.02321 |
| 0.225 | 0.02258 |
| 0.230 | 0.02198 |
| 0.235 | 0.02141 |
| 0.240 | 0.02087 |
| 0.245 | 0.02035 |
| 0.250 | 0.01986 |
| 0.255 | 0.01940 |
| 0.260 | 0.01895 |
| 0.265 | 0.01853 |
| 0.270 | 0.01812 |
| 0.275 | 0.01773 |
| 0.280 | 0.01736 |
| 0.285 | 0.01700 |
| 0.290 | 0.01666 |
| 0.295 | 0.01633 |
| 0.300 | 0.01601 |

The values within the look-up table are stored within the data storage device 90 associated with the microprocessor 68.

From the look-up table, the brake pulse is selected which will stop the motor with the magazine 30 in the proper plane. The brake pulse is applied when the leading edge of the last flag 64 is aligned with the sensor 65 in order to accurately stop the magazine with the middle of the flag 64 aligned with the sensor 65. Advantageously, the width of the brake pulse is less than that of a brake pulse which would cause the magazine to stop and begin to move in the opposite direction. The brake pulse is determined based on the next higher value for the time between flags stored within the data storage device 90. Of course, rather than providing a look-up table, microprocessors could be provided which would make the calculation for every time between flags 64 measured. Advantageously, a look-up table can be provided at far lesser cost with very little difference in accuracy.

As seen in FIG. 3, a pusher 91, driven by a pusher drive system, is used to push the cartridge 38 into the acceptor so that the acceptor will accept the cartridge. In the preferred embodiment, the pusher drive system includes a pusher motor 94, a pusher gear train 96, and a pusher belt 100, and a pusher belt wheel 104.

Figure 5:
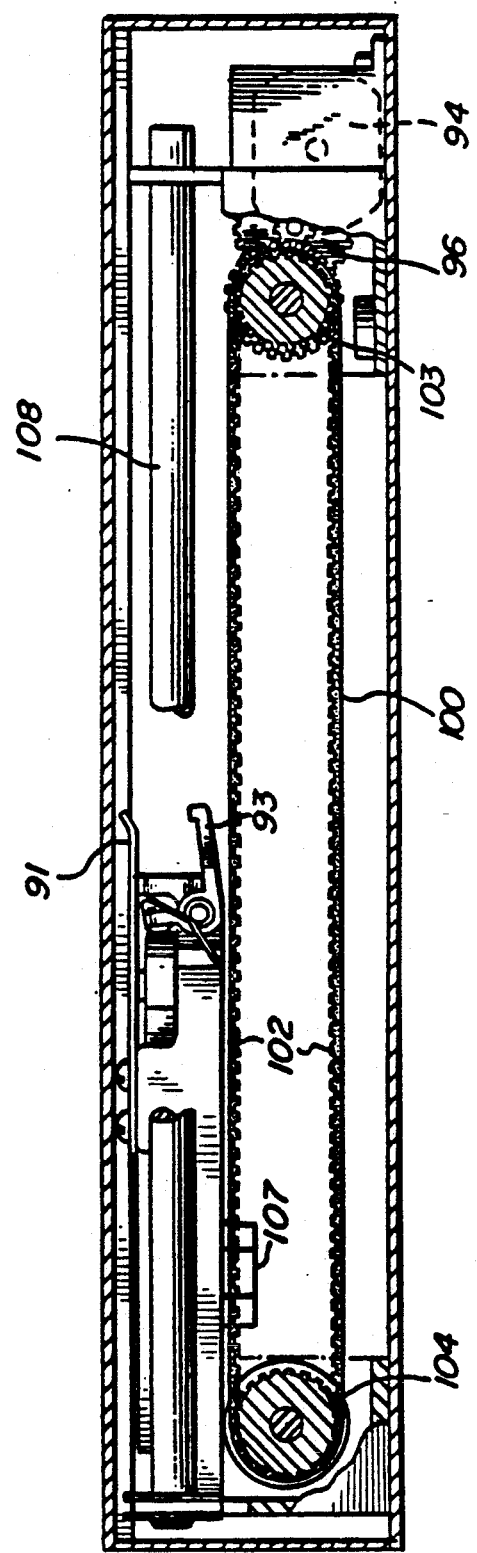
FIG. 5 is a right sectional side view of the cartridge loader of FIG. 1;.

The pusher motor 94 drives a system of reduction gears 96, covered by a gear plate 97, which in turn drives a belt 100. As seen in FIG. 3, the pusher motor 94 and its associated gears 96 are mounted in a rear corner of the loader, opposite the magazine drive motor 80 and its gear train 84. As best seen in FIG. 5, the underside of the belt 100 has grooves 102 which interconnect with the last gear 103 of the pusher gear train 96 to cause it to be driven by the pusher motor 94. The belt 100 is held in loop configuration with a pusher belt wheel 104, shown in phantom in FIG. 3, which rotates freely and is located at the front side of the loader, opposite the pusher gears 96.

Figure 4:
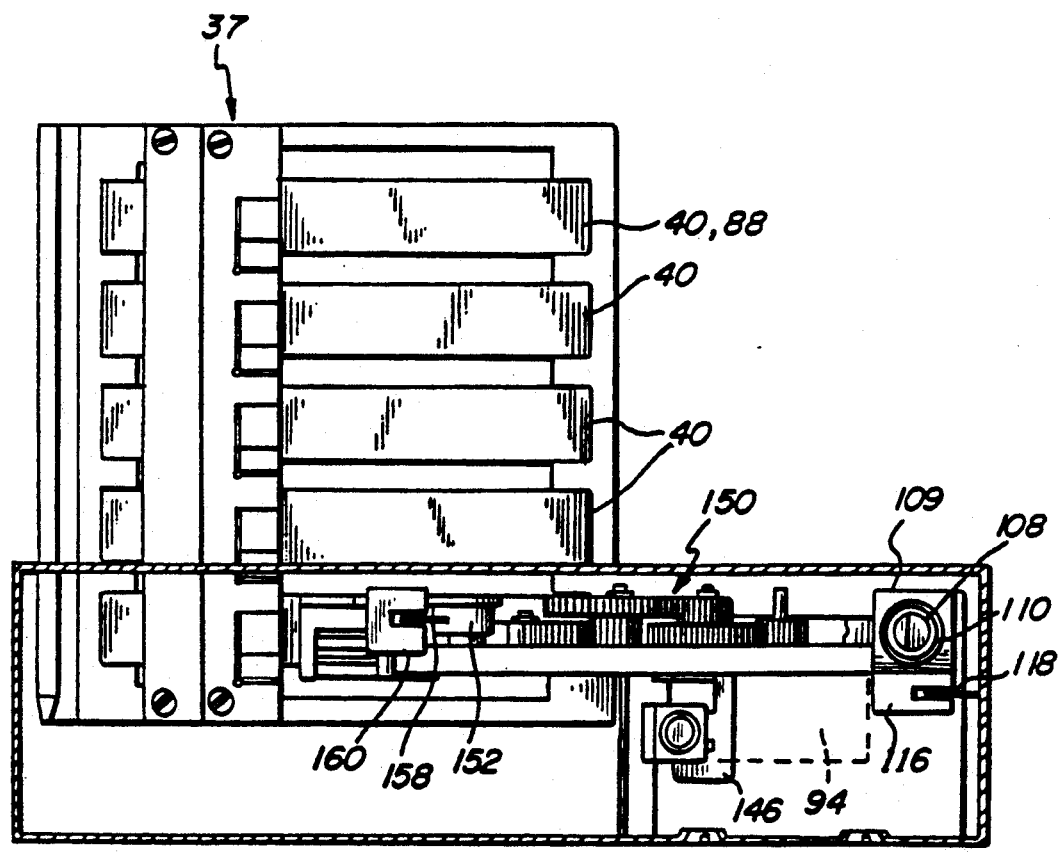
FIG. 4 is a front sectional view of the cartridge loader of FIG. 1.

The pusher carriage 106, upon which the pusher 91 rides, is a three sided piece which comprises a short rectangular piece 109, making up the first side, which is disposed over the belt 100, and a flat component 111 which makes up the other two sides of the pusher carriage 106. The rectangular piece 109 is attached to the belt 100 in a known manner, such as with a clamp 107, seen in FIG. 5. The pusher carriage 106 is thereby moved through the action of the pusher motor 94. The pusher carriage rides along a cylindrical pusher rail 108, shown partially cut away in FIG. 3 to reveal the belt 100. In the preferred embodiment, the rectangular piece 109 has a circular hole 110 cut therethrough which is best seen in FIG. 4. The rectangular piece 109 completely encircles the rail 108, in order to prevent side to side motion.

The rectangular piece 109 is mounted on the flat component 111. The flat component 111 is generally L-shaped, with the end of the flat component 111 mounted perpendicular to the rectangular piece 109. The end closest to the rectangular piece 109 is wider than the other part of that side of the flat component 111. The side of the wide portion of the flat component opposite the rectangular piece rides along a side rail 112 on sliding shoes 113. The flat component 111 must be shaped so as not to interfere with other parts of the loader 12. For example, in the preferred embodiment, as seen in FIG. 3, the front corner of the flat component 112 is cut off so as to leave room for the belt wheel 104 when the pusher 91 is in its furthest back position. The side rail 112 is a strip of metal running from the pusher motor 94 to the front of the loader 12 at a height sufficient to keep the pusher 91 horizontal when the rectangular piece 109 is mounted on the pusher rail 108.

The pusher 91 is mounted on the side of the flat component 111 which is parallel to the rectangular piece. That side of the flat component is relatively narrow so as not to interfere with other components of the loader while the pusher carriage 106 is moving. The pusher 91 has a pushing end 92 formed by a planar piece of material which is bent up at one end in order to accommodate the cartridge 38 underneath it. Disposed underneath the pusher 91 is a gripper 93, which is described in more detail below.

Figure 6:
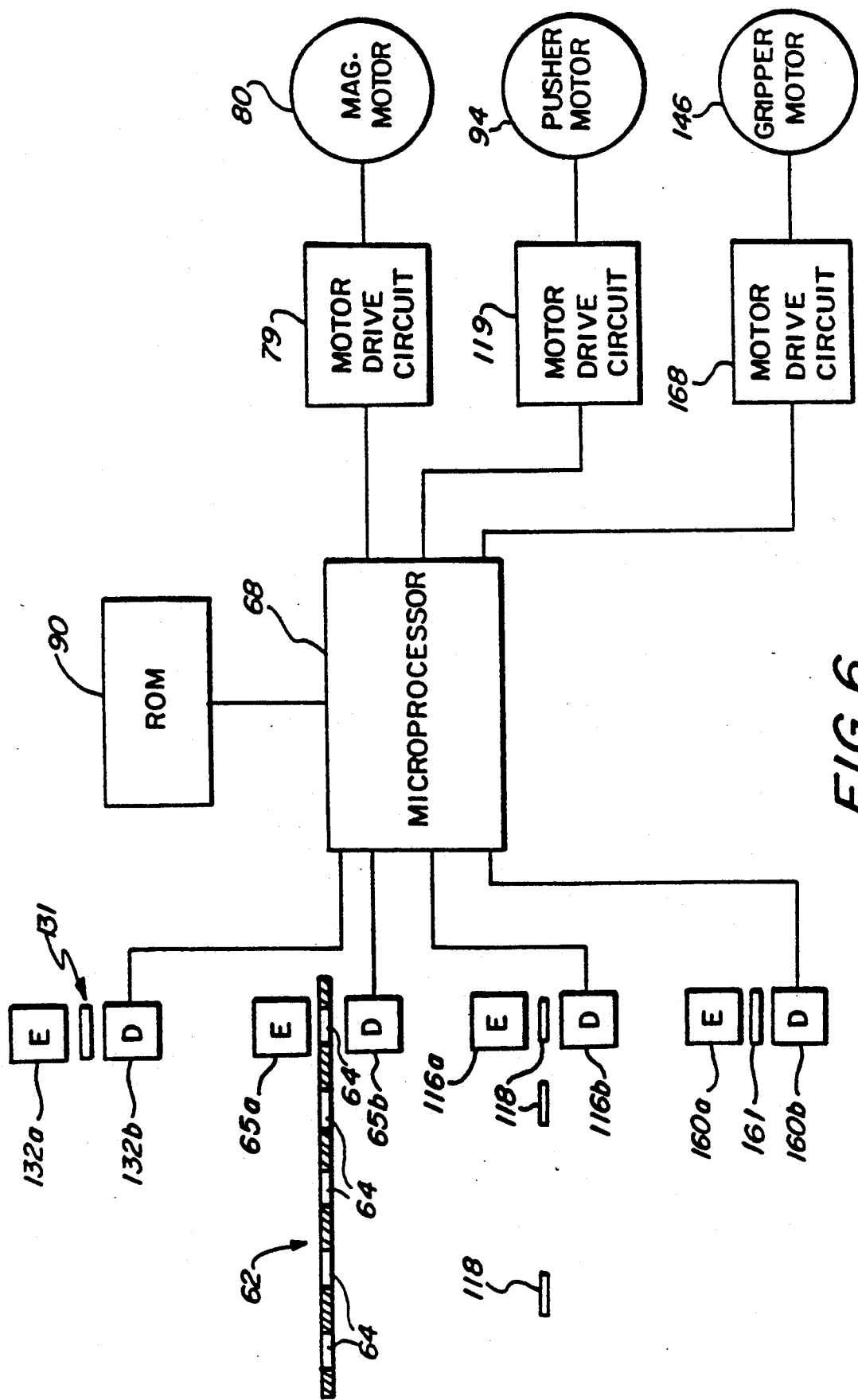
FIG. 6 is a schematic representation of the electronic circuitry of the cartridge loader.

Referring to FIGS. 4 and 6, mounted on the underside of the rectangular piece 109 along the side closer to the wall of the housing of the loader, is a pusher sensor 116. The sensor may be mounted so that it slides within the loop formed by the belt 100. The pusher sensor 116 of the preferred embodiment is an LED emitter 116a and a light detector 116b mounted on opposite sides of a C-bracket. Mounted along the wall of the loader 10, adjacent the pusher sensor are three flags 118, corresponding to the pusher's three stopping locations which will be described below. The flags are advantageously mounted away from a position where they might entangle the cable 29 providing power to the loader 10. The flags 118 may be of any flat, opaque material, however, they are preferably constructed of sheet metal. The flags 118 pass through the slot between the C-bracket of the sensor 116 during the motion of the pusher 91. When the sensor 116 passes through the flags 118 the light is blocked as a signal that the pusher 91 is in one of the three stopping positions corresponding to each individual flag 118. As represented in FIG. 6, when the sensor 116 is over one of the flags 118, a signal is sent to the pusher motor drive circuit 119 and the information is stored in the memory circuit 90. Of course, other flag and sensor combinations known to those of skill in the art may substitute for the combination described here.

The pusher motor 94 is activated by the pusher motor drive circuit 119 after a slot 40 is vertically aligned with the acceptor of the cartridge drive 12. When the slot 40 is first aligned, the pusher will be at its rear-most location, or "Home" position. The pusher sensor 116 will be over the Home flag 122 when the pusher 91 is at this position. When voltage is applied to the pusher motor, the pusher gears 96 will engage, thereby moving the last gear 103 with an approximately 65:1 final gear ratio in the preferred embodiment. The last gear 103 will drive the belt 100 upon which the pusher is mounted, thereby moving the pusher 91. The pusher 91 moves through the "Deposit" position where the gripper 93 touches the cartridge 40 inside the slot 38. Advantageously, the gripper 93 and pusher 91 combination have a vertical height short enough and a side-to-side width thin enough to fit through the magazine slots 40.

When the pusher is at the Deposit position, the sensor 116 is over the Deposit flag 123. The pusher 91 continues moving past this position, thereby pushing the cartridge 38, until the pusher 91 reaches the "Load/Unload" position. The pusher motor will be signaled to stop moving by the sensor 116 being over the Load/Unload flag 124.

While the accuracy of the stopping of the pusher is not as critical as that of the magazine, in a preferred embodiment, the pusher motor 94 can be stopped accurately using a method similar to that described above in connection with the stopping of the magazine motor 80. The $\omega_{avg}$ of the motor may be determined measuring the time it takes to move the pusher 91 between any two positions at known distances. Thus, $\omega_{avg}$ for purposes of the movement of the pusher from the Home to the Load/Unload positions may be measured by measuring the time for the sensor 116 to move from the Deposit flag 123 to the Load/Unload flag 124. The brake width 95 which will accurately stop the pusher motor 94 is determined from a look-up table stored in the data storage device 90, which can be generated from equation (14) using the appropriate constants for the pusher motor 94.

When the pusher 91 reaches the Load/Unload position, the acceptor of the drive 12 will accept the cartridge 38 for engagement with the read/write head of the drive. The pusher waits at the Load/Unload position until the cartridge is returned.

When the cartridge is ejected by the acceptor of the drive 12, a cartridge present sensor activator 128, which is seen in FIG. 2, will be engaged. The cartridge present sensor activator 128 is located near the rear of the loader 10 over the magazine drive motor 80 and its gears 84. The cartridge present sensor activator 128 comprises a wedge shaped piece 129 which has a radial axle 130 and a sensor flag 131. The cartridge present sensor activator 128 is spring mounted so that it remains above the plane of the gear plate 89 unless a cartridge 38 is present over it. Alternatively, the cartridge present sensor activator 128 may be mounted in the horizontal plane, so that the side of cartridge 38 will contact the activator 128. When the cartridge 38 trips the cartridge present sensor activator 128, the flag 131 slips into a generally C-shaped electrical cartridge present sensor 132, located adjacent the cartridge present sensor activator 128. The sensor 132 comprises an emitter 132a and detector 132b, and communicates to the microprocessor 68, as represented in FIG. 6, that a cartridge 38 is present.

The pusher is provided with a gripper 93 in order to retrieve the cartridge when it is ejected by the drive 12. The gripper 93 of the preferred embodiment is an L-shaped piece, seen best in FIG. 2, which is held by a short axle 136 at its corner. The bottom of the gripper is bent up at its end in order to create a hook 140. The hook 140 engages the depression 46 found on the front of the cartridge 38 when the gripper closes on the cartridge in accordance with the preferred embodiment. By partial rotation about the axle 136, the gripper can be moved from its open to its closed position and back. The gripper 93 is held in the closed position by a retaining spring 142. The axle 136 is mounted on the pusher carriage 106 so that the hook 140 remains underneath the tip of the pusher 91 at all times. Advantageously, the distance between the pusher 91 and the open position of the gripper hook is sufficient to enable a cartridge to slide loosely between them. Likewise, the distance between the pusher 91 and the closed position of the hook 140 is only sufficient to allow a cartridge to be gripped tightly between them.

The motion of the gripper 93 is controlled by a gripper motor 146 mounted vertically underneath the wide portion of the flat component 111 of the pusher 91, so that the motor 146 travels with the pusher 91 and gripper 93. The motor 146, advantageously, is a stepper motor. The motor 146, shown in FIG. 4, drives a gear train 150, seen in FIGS. 3 and 4. The gear train 150, advantageously, rides on the part of the flat component 111 which is perpendicular to the pusher 91 and rectangular component 109. The last gear 152 of the gear train 150 rotates only ±30° and is prevented from moving further by the provision of a stop pin 154 on either side of the gear. The last gear 152 has grooves only on the side which connects to the remainder of the gear system 150. Opposite the grooved side of the last gear 152 there may be provided a flag 161, which will pass through a generally C-shaped gripper sensor 160, consisting of a LED emitter 160a and a detector 160b, which is also mounted on the pusher carriage 106. The flag, in a preferred embodiment, may have a cutout which will pass through the sensor 160 to allow light to pass when the gripper 93 is fully open. Alternatively, the flag may block light through the sensor 160 only when the gripper 93 is fully open or closed. In a particularly preferred embodiment, the flag is sized so that the flag blocks light through the sensor 160 only when the gripper 93 is between the fully open or fully closed position. The gripper sensor 160, advantageously, is provided as an indication of whether the gripper 93 is fully open or closed. Advantageously, as diagramed in FIG. 6, this information is passed to the microprocessor 68 which will send the information to be stored in the non-volatile memory device 90. Although the unblocking of the sensor 160 signals both that the gripper 93 is fully open and fully closed, the position of the gripper 93 can still be determined if power is cut off due to the provision of the non-volatile memory. In the preferred embodiment, the indication of the position of the gripper 93 enables the loader 10 to prevent errors in loading or unloading. In a particularly preferred embodiment, the gripper motor 146 will repeat an opening or closing motion until the proper indication from the gripper sensor 160 is received.

The last gripper gear 152 moves with rotational motion in the horizontal plane. This gear 152 is connected to a flat cam connector 162 which translates the rotational motion in the horizontal plane of the last gear 152 to linear motion. The cam connector 162 is connected to a cam 166 which pushes on the upright portion of the gripper 93 to put pressure against the gripper spring 142 overcoming the bias of the spring, thereby opening the gripper 93. Thus, the linear motion of the cam connector 162 is converted to a rotational motion of the gripper 93 in the vertical plane. The motion of the gripper motor 146 in the opposite direction will cause the cam 166 to release the pressure on the spring 142, thereby causing the gripper to close. Advantageously, the gripper 93 is biased closed through the action of the spring 142 rather than through action of the motor 146, thereby preventing excessive force from being applied to the cartridge 38 while it is gripped. Excessive force might crush the plastic case of a cartridge 38.

AUTOMATED OPERATION OF THE PREFERRED EMBODIMENT

Referring now to FIGS. 7a through 7l, there is shown a schematic representation of the operation of the automated cartridge loader 10 when connected to a cartridge drive 12 in accordance with the preferred embodiment.

Figure 7A:
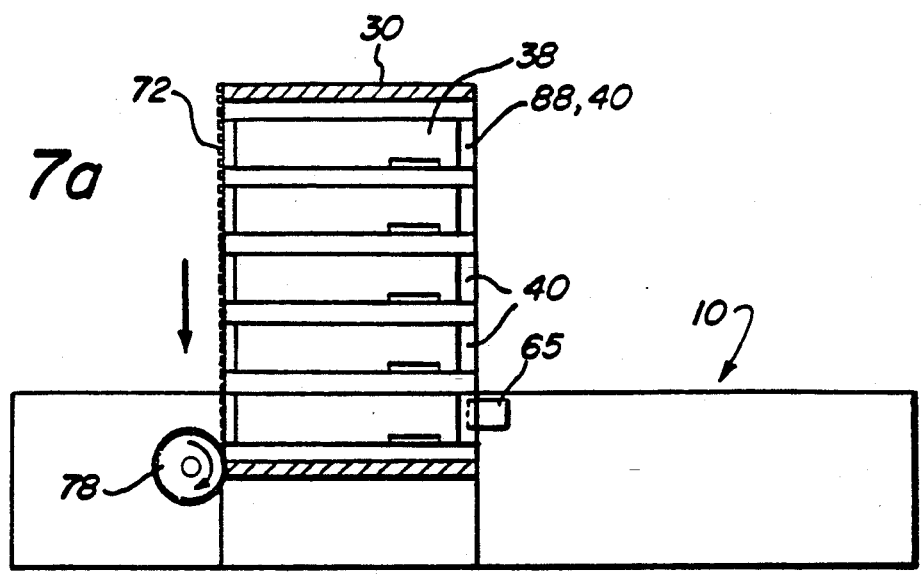
Figure 7B:
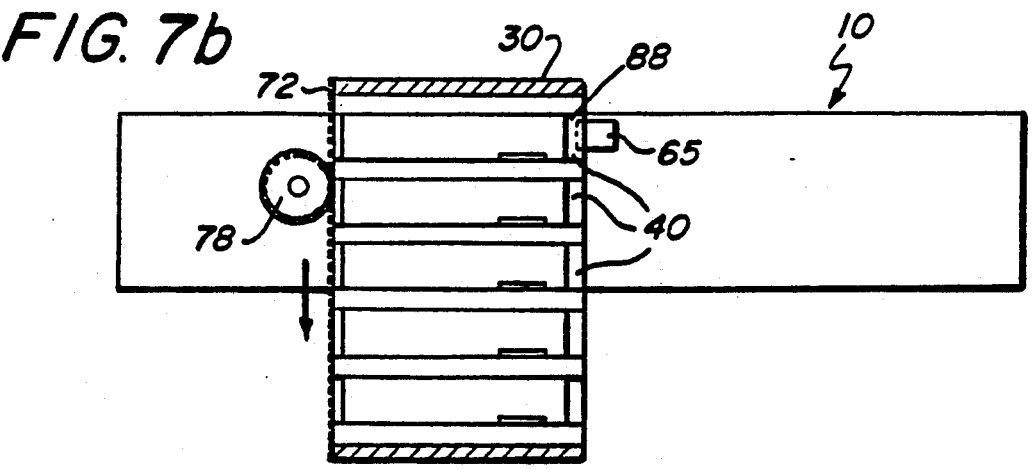

In FIG. 7a, there is shown a representation of a standard magazine 30 loaded with a cartridge 38 in each of its five slots 40. The magazine 30 has just been loaded by an operator into the magazine opening 34 so that the cartridges 38 within the slots 40 are aligned side to side with the acceptor of the drive 12, and the sensor 65 has sensed the insertion of the magazine 30. After a short delay, the magazine motor (shown at 80 in FIG. 3) will have driven the last gear 78 in a clockwise direction. The last gear 78 is meshingly engaged with the rack 72 on the magazine 30, therefore, the magazine is driven downward. In the preferred embodiment, the sensor 65 counts four flags (shown at 64 in FIG. 1) and the sensor 65 turns on a timer when the fourth (penultimate) flag arrives. The elapsed time between the fourth and fifth (last) flags is used to determine the width of the brake pulse as described above. The brake pulse is applied to accurately stop the magazine with the first slot 88 vertically aligned with the acceptor of the cartridge drive 12 and with the pusher 91 to arrive at the position shown in FIGS. 7b-7c. Advantageously, the bottom of the magazine 30 is above the top of a table upon which the drive and loader combination is horizontally mounted. In alternative embodiments, the magazine 30 is moved to a position wherein the cartridge 38 in the slot 40 corresponding to the first flag is in the same plane as the cartridge drive opening.

Figure 7C:
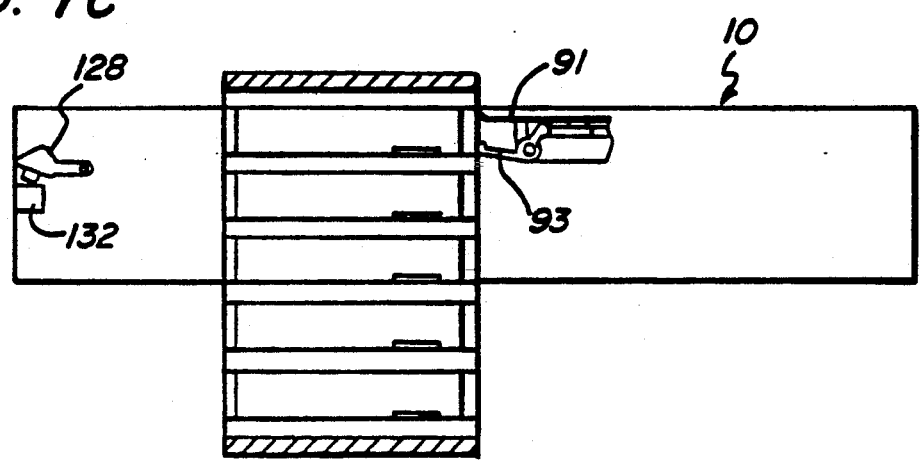

The load cycle is shown in FIGS. 7c through 7e. FIG. 7c shows the start of the first load cycle. The pusher 91 is at the Home position with the gripper 93 in the closed position. The pusher motor (shown at 94 in FIG. 3) is activated to move the pusher rearward through the Deposit position where it will make contact with the cartridge 38 and move on to the Load/Unload position, thereby pushing the cartridge and arriving at the position shown in FIG. 7d. The pusher motor 94 may be accurately stopped using a brake pulse determined from a look-up table as described above in connection with the stopping of the magazine motor. As the cartridge 38 is pushed forward, the cartridge will trip the cartridge present sensor activator 128, thereby activating the cartridge present sensor 132 which will send a signal through the microprocessor 68 that a cartridge has gone into a position to be loaded into the drive. When the cartridge has been pushed to the Load-/Unload position, the standard drive acceptor will physically remove the cartridge from the Load/Unload position and move it into engagement with the read/write head of the drive 12. FIG. 7e shows the pusher 91 at the Load/Unload position after the drive has removed the cartridge 38. After the drive has removed the cartridge, the cartridge present sensor 132 will detect that the cartridge is gone, sending a signal through the gripper drive motor circuit to start the gripper motor (shown at 146 in FIG. 4) to open the gripper 93 in preparation for the unload cycle. During this period, the drive will record or read the cartridge 38. When the cartridge is fully recorded the acceptor of the drive will eject the cartridge.

FIGS. 7f through 7j show the unload cycle. As shown in FIG. 7f, when the drive ejects the cartridge 38 the cartridge 38 will move over the cartridge present sensor activator 128 and thereby activate the cartridge present sensor 132. This will signal the gripper motor to close on the depression 46 at the front of the cartridge 38. Advantageously, the drive ejects the cartridge 38 with a spring action, so that the cartridge 38 will return all the way into the jaws of the gripper 93 and pusher 91 combination.

Figure 7G:
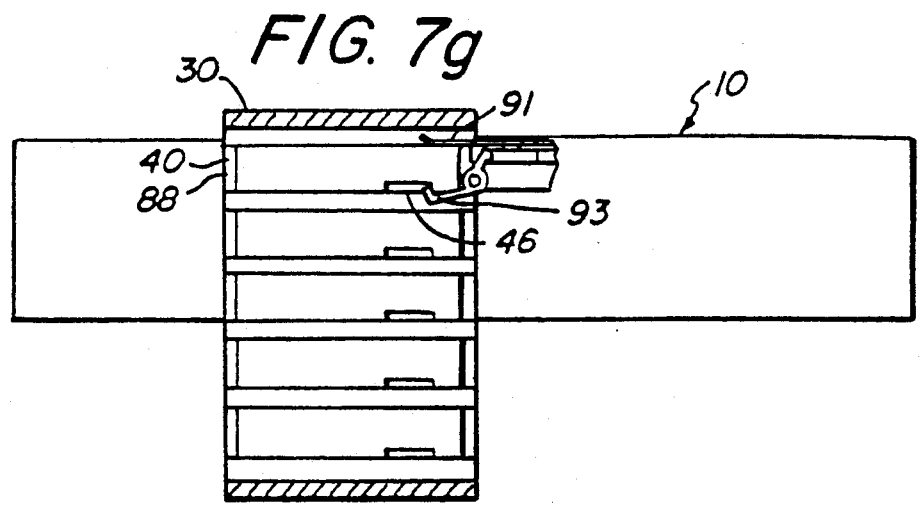

Once the gripper 93 is closed on the cartridge 38, the gripper 93 rides, with the pusher 91 as the pusher motor 94 pulls the pusher 91 back to the Deposit position, as shown in FIG. 7g. When the pusher motor 94 is stopped using the brake pulse determined from a look-up table, the $\omega_{avg}$ is determined by measuring the time to move the pusher sensor 132 the known distance between the Load/Unload flag 124 and the Deposit flag 123. Once the pusher is at the Deposit position, the cartridge 38 will be in its slot 40, flush against the retaining block 37 of the magazine 30. The pusher motor 94 may advantageously be stopped with a brake pulse applied at the Deposit position. The width of the brake pulse is determined by measuring the time to move the pusher from the Load/Unload position to the Deposit position and referring to a look-up table stored in the memory device (represented as 90 in FIG. 6), as described above in connection with the stopping of the magazine motor 80.

Figure 7H:
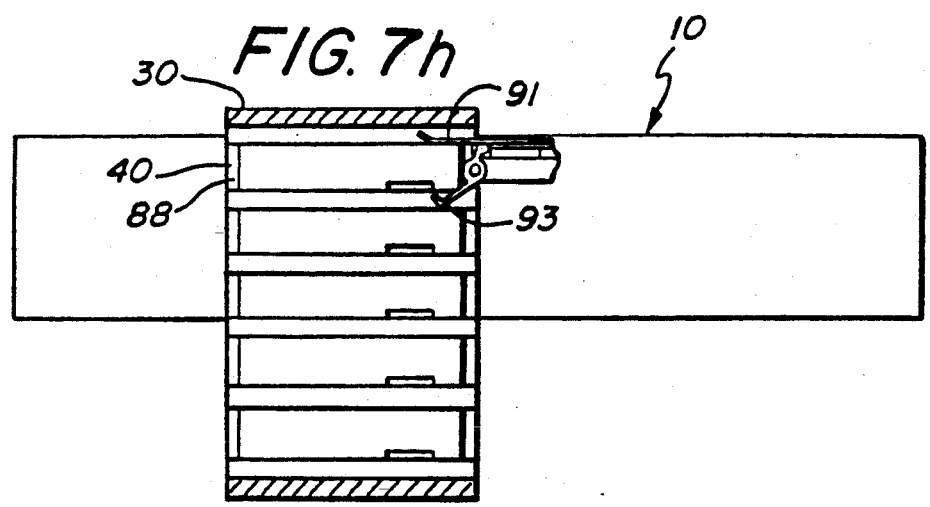
Figure 7I:
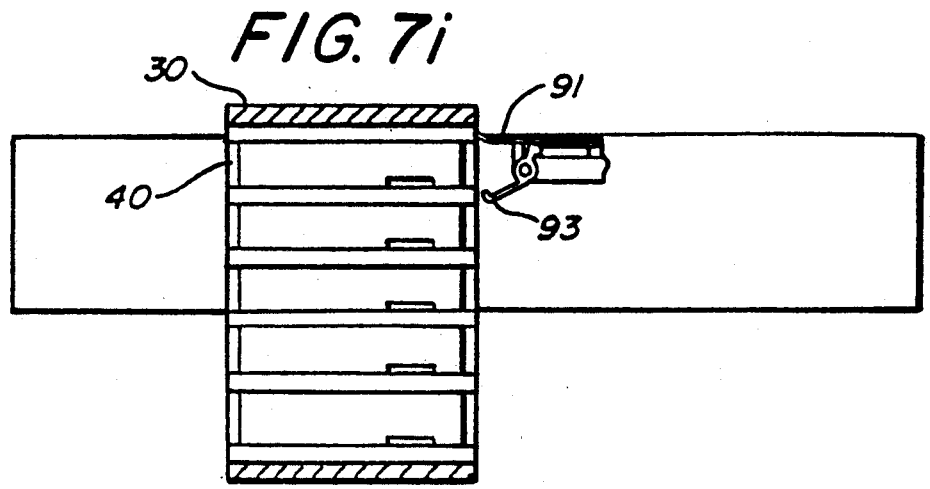

Once the cartridge 38 is in its slot 40 in the magazine 30, the gripper motor 146 will open the gripper 93, as shown in FIG. 7h. The pusher motor 94 will then move the pusher 91 back to the Home position, as seen in FIG. 7i. When determining the brake pulse with a look-up table, $\omega_{avg}$ is determined by measuring the time taken in moving the pusher sensor 132 from the Deposit flag 123 to the Home flag 122. Once the pusher 91 is at the Home position, the gripper motor 146 will then close the gripper 93, as shown in FIG. 7j.

The magazine motor 80 will then move the magazine 30 until the next slot 40 is vertically aligned with the acceptor of the drive, as shown in FIG. 7k. In the preferred embodiment, the magazine 30 is moved up one slot 40 at a time. However, in other embodiments wherein the first cartridge 38 to be loaded is in the uppermost slot, the magazine 30 is moved downward. The time to move the magazine between the flags (seen at 64 in FIG. 1) will be measured in order to determine $\omega_{avg}$. The $\omega_{avg}$ may then be used to determine the width of a brake pulse 95 which will accurately stop the motor 80 with the cartridge 38 in the same plane as the cartridge acceptor.

The load and unload cycles shown in FIGS. 7c to 7j, and the translation of magazine 30 as shown in FIG. 7k by the motion of the gripper 91, seen in phantom at the Load/Unload position, will repeat until either an empty slot is encountered by the cartridge present sensor 128 after the pusher 91 pushes through the slot to the Load-/Unload position or until the cartridge 38 in the fifth slot is returned to the magazine 30. When either event occurs, the pusher 91 returns to the Home position and the magazine drive motor 80 moves the magazine 30 through the motion of its last gear 78 up to the eject position as shown in FIG. 7l.

In accordance with an improved cartridge loader, there may be provided a random access mode to provide access to the cartridges 38 in any order, through the provision of a user interface.

In accordance with the above description of the automated operation of the cartridge loader 10, there is provided a method of sequentially loading a plurality of cartridges into a cartridge drive. The method comprises loading the cartridges 38 into the magazine 30, loading the magazine 30 into the opening of the loader 34, causing the loader 10 to sequentially load each of the cartridges 38 into the cartridge drive 12, causing the cartridge drive 12 to record or read each of the cartridges 38 after it is loaded into the drive 12, causing the loader 10 to unload each of the cartridges 38 after the drive 12 records data on it, causing the loader 10 to eject the magazine 30, and removing the magazine 30 from the loader 10.

Figure 9A:
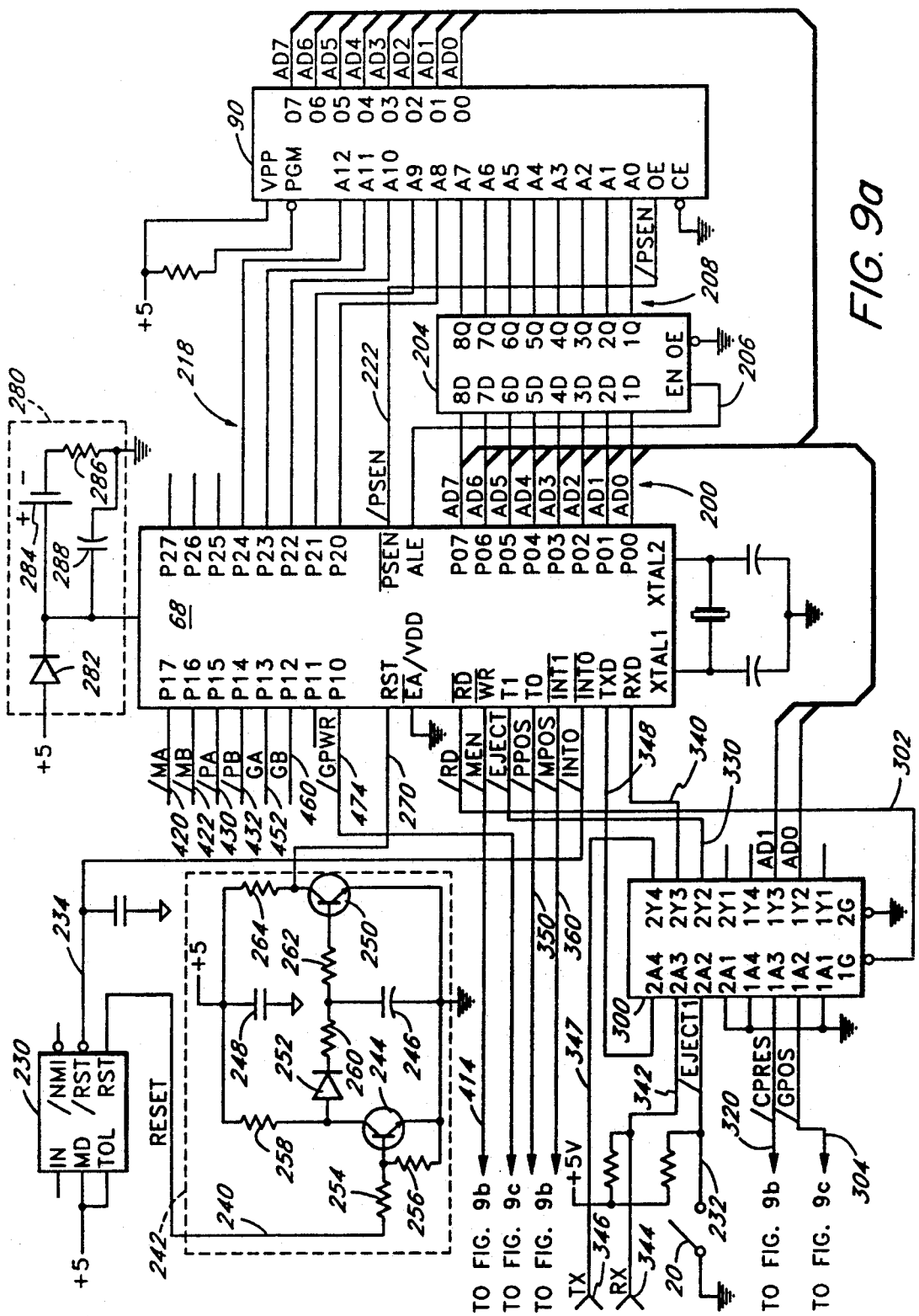
FIGS. 9a, 9b and 9c illustrate a preferred embodiment of an electronic circuit that implements the block diagram of FIG. 6.
Figure 9B:
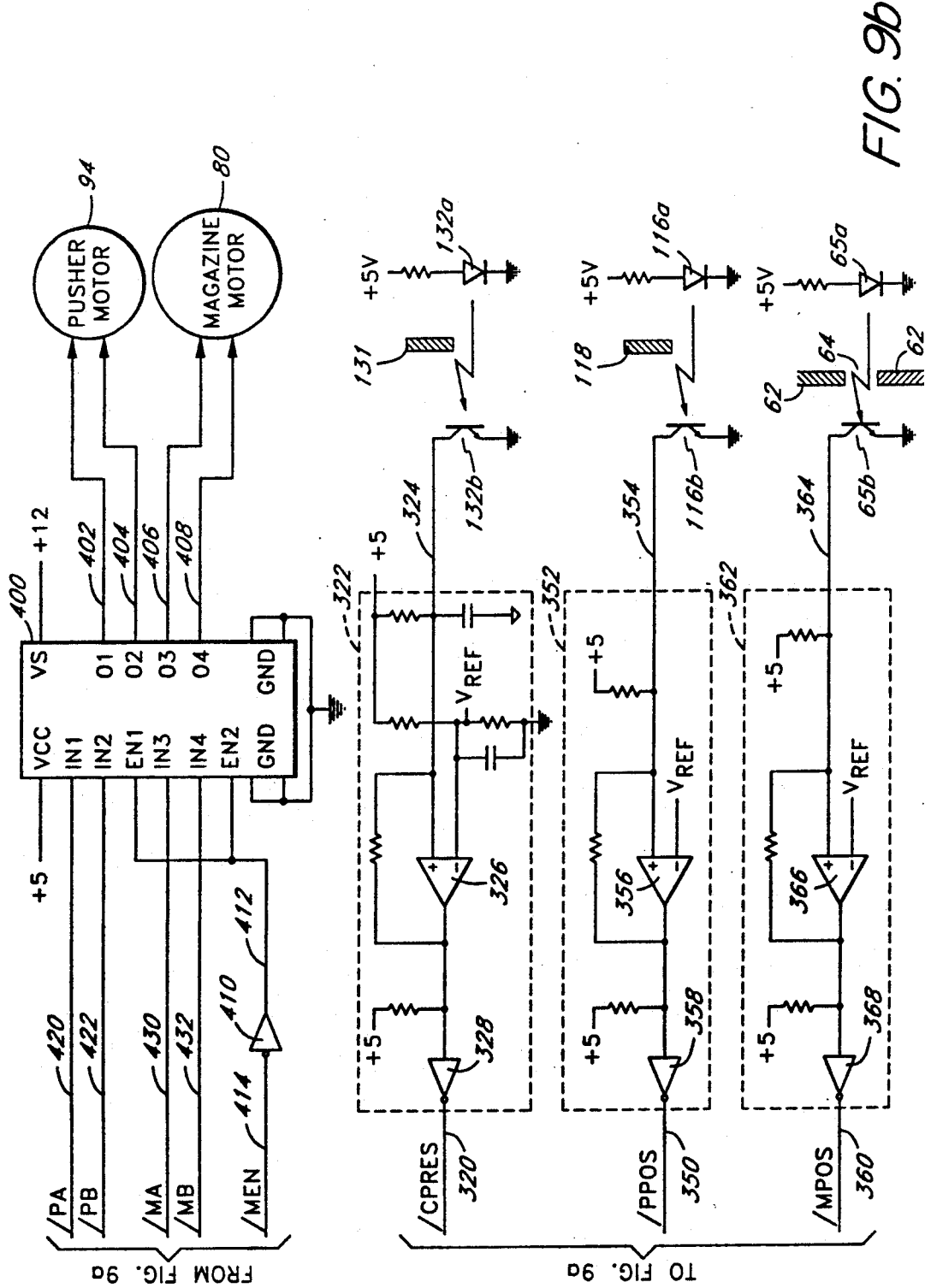
Figure 9C:
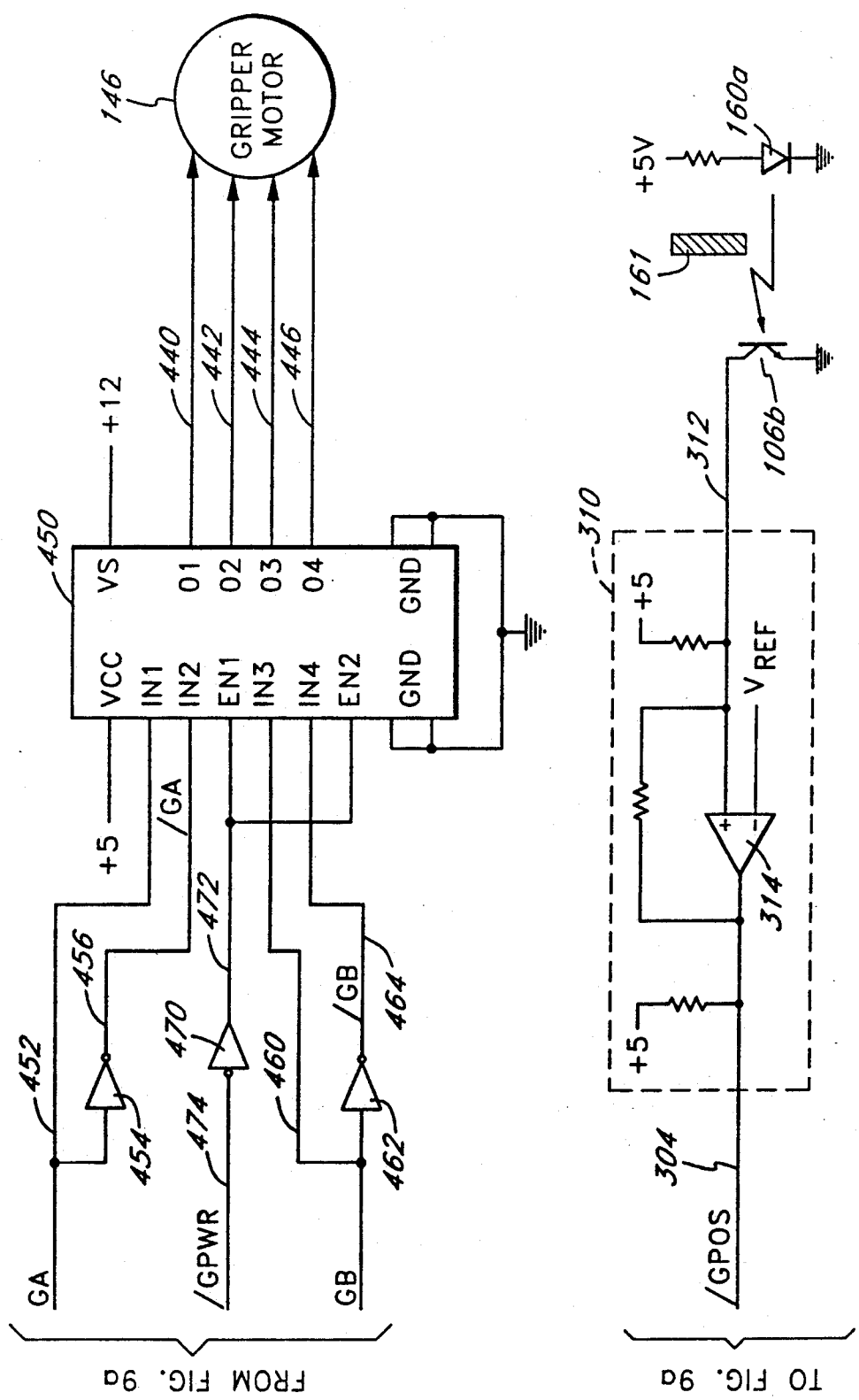

A preferred embodiment of an electronic circuit for controlling the cartridge loader is illustrated in FIGS. 9a, 9b and 9c. As illustrated, the circuit includes the microprocessor 68, which is advantageously an Intel 80C31 CMOS single-chip, 8-bit microcontroller, or an equivalent, having an internal random access memory and having two internal 16-bit timer/counters. The identification symbols within the microprocessor 68 and the other circuit elements described hereinafter are the conventional symbols for the circuit elements. The identification symbols will be understood by one skilled in the art and can be found in the data sheets and application notes for the circuit elements. For example, for the purposes of the following discussion, the set of connections labelled as "P00-P07", "P10-P11" and "P20-P27" within the microprocessor 68 are input/output ports by which the microprocessor 68 transmits data to and receives data from other devices. The other connections will be described as needed hereinafter.

The microprocessor 68 is connected to the PROM 90 via a set of address/data lines 200 which are connected to the port connections P00-P07. Preferably, the address data lines 200 are buffered by a latch 204 (e.g., a 74LS373 from Texas Instruments, or an equivalent) which provides a latched set of address lines 208 as address inputs to the ROM 90. The latch 204 is controlled by the microprocessor 68 via an ALE (address latch enable) line 212 which is provided as an output of the microprocessor 68.

In the preferred embodiment, the ROM 90 is an erasable programmable read only memory (PROM) such as the Intel 2764A, or an equivalent, which provides 8,192 8-bit words of data storage. The ROM 90 provides output data on the address/data lines 200 which are provided as inputs to the microprocessor 68. In addition to the latched set of address lines 208, the selection of data by the ROM 90 is controlled by a set of address lines 218 which are provided as outputs from the port connections P20-P24 of the microprocessor 68. The ROM 90 enables data on its outputs when the microprocessor 68 presents an active low signal on a /PSEN line 222 which is connected to the corresponding output of the microprocessor (the "/" symbol in front of a label or a bar above a signal are used interchangeably to indicate an active low logic signal in a conventional manner).

The microprocessor is connected to the output of a conventional power monitor circuit 230, which, in the preferred embodiment, is a DS1231 power monitor available from Dallas Semiconductor. The power monitor circuit 230 is connected to the standard 5 volt power supply and monitors the supply for deviations from a normal operating range. When such a deviation is detected, the power monitor circuit 230 generates an active low interrupt signal on an /INT0 signal line 234 which is connected to the corresponding INT0 interrupt input of the microprocessor 68. The microprocessor 68 is advantageously programmed to respond to an active interrupt signal and enter a power down routine to deactivate any motor movements in progress when the interrupt occurs. Thus, when the power drops below the operating limits of the microprocessor 68, all motor movement activities will be quiescent.

The power monitor circuit 230 further generates an active high RESET signal on a line 240. The reset signal is provided as an input to a reset circuit 242. The reset circuit 242 includes a first transistor 244, a first capacitor 246, a second capacitor 248, a second transistor 250, a diode 252, as well as resistors 254, 256, 258, 260, 262 and 264. The first transistor 244 is normally off so that the first capacitor 246 is charged via the resistor 258, the diode 252 and the resistor 260. Thus, the transistor 256 is biased on by the base current provided through the diode 252. When the RESET signal on the line 240 becomes active high, the first transistor 244 is biased on via the resistors 254 and 256. The voltage at the anode of the diode 252 becomes very low so that the base current for the second transistor 250 is supplied by the first capacitor 246 which gradually discharges. After a predetermined amount of time, the base current to the second transistor 250 becomes insufficient to maintain the second transistor 250 in the on condition and it switches off. When this occurs, the collector of the second transistor 250 becomes high via the resistor 264 connected to the voltage supply (e.g., +5 volts). The collector of the second transistor is connected to a reset input line 270 which is connected to the RST input to the microprocessor 68. The reset circuit 242 thus operates to provide a delayed reset signal to the microprocessor 68 after the power monitor circuit 230 detects a power deviation so that the microprocessor 68 has time to complete the power down routine before being reset. The reset circuit also has the effect of providing a power on reset signal to the microprocessor 68 in that the first capacitor 246 is initially discharged. When voltage is first applied to the reset circuit, the first capacitor 246 charges slowly so that the second transistor 256 remains off for a predetermined amount of time. During this time the reset input signal on the line 270 is held in its active high condition by the resistor 264. The second capacitor 248 functions as a local filter capacitor to reduce any noise that might otherwise be present in the power supply and be communicated to the reset signal.

The microprocessor 68 receives power from a backup power circuit 280 which includes a diode 282, a rechargeable battery 284, a resistor 286 and a capacitor 288. When power is available from a conventional 5-volt power supply, the power input to the microprocessor 68 is provided from the 5-volt supply via the diode 282. At the same time, the rechargeable battery 284 is charged from the 5-volt supply through the resistor 286. The rechargeable battery 284 is advantageously a nicad battery that has an output voltage of 3.5 volts, for example. When the conventional 5-volt power supply becomes disabled, either deliberately or as a result of an unintentional power failure, no current is provided through the diode 282, and the rechargeable battery 284 provides power. The 3.5 volts provided by the battery 284 is insufficient to allow the microprocessor 68 to operate normally; however, the voltage is sufficient to maintain the data in the internal RAM so that the data will be available when the microprocessor 68 is again activated upon return of normal power. Thus, when the microprocessor 68 performs the power down routine, data identifying the current position of the magazine 30, the pusher carriage 106, a cartridge and the gripper 91 are stored in the internal RAM so that the microprocessor 68 can resume operation at a known condition when power is restored.

As further illustrated in FIG. 9a, a tri-state octal buffer 300 (e.g., a 74LS244, from Texas Instruments, or an equivalent) is provided. The buffer 300 is controlled by a read signal (/RD) output on a line 302 from the microprocessor 68. When the read signal is active low, the buffer 300 activates its output lines with data corresponding to the signals on its input lines. When the read signal is inactive, the outputs of the buffer 300 present a high impedance to the respective output lines.

Two of the outputs of the buffer 300 are connected to two of the address/data lines 200. The first output of the buffer 280 is connected to the least significant address/data line (AD0). The corresponding first input to the buffer 280 is connected to a gripper position sensing signal line (/GPOS) 304 which is connected to the output of a gripper position sensor circuit 310 shown in FIG. 9c. The input of the gripper position sensor circuit 310 is connected to the gripper position sensor detector 160b (described above in connection with FIG. 6) via a gripper position input signal line 312. The gripper position sensor detector 160b is advantageously an OPB865T51 photodetector available from TRW Optron, or an equivalent. The gripper position sensor circuit 310 includes a comparator 314, such as an LM339 available from National Semiconductor, or the like, which provides an output signal that has a first logic level when the detector 160b receives light from the emitter 160a and a second logic level when the light from the emitter 160a is blocked by the presence of the flag 161. Thus, by activating the read signal (/RD), the microprocessor 68 can monitor the gripper position via the least significant address/data line AD0.

Similarly, the second output of the buffer 300 is connected to the next least significant address/data line AD1. The corresponding second input of the buffer 300 is connected to a cartridge present signal line (/CRPES) 320 which is connected to the output of a cartridge present sensing circuit 322 (FIG. 9b). The input to the cartridge present sensing circuit 322 is connected via cartridge present input sensing line 324 to the cartridge present sensor detector 132b (described above in connection with FIG. 6) which is advantageously a photodetector such as described above. The cartridge present sensing circuit 322 operates in a similar manner to the gripper position sensing circuit described above, and includes a comparator 326 which provides an output signal having a first logic level when the light from the cartridge present sensor emitter 132a to the detector 132b is blocked by the flag 131 and having a second logic level when the light is not blocked. The cartridge present sensing circuit 322 further includes a logic inverter 328, such as a conventional 74LS04, or the like, to invert the logic level output of the comparator 326 before presenting the signal to the cartridge present signal line 324. Thus, by activating the read signal (/RD), the microprocessor 68 can monitor the presence of a cartridge via the next least significant address/data line AD1.

The buffer 300 has a third output that is connected to an input (T1) to one of the internal timers of the microprocessor 68 via a line 330. Although input (T1) is to a timer, this input is used as a general input to the microprocessor 68. The corresponding input to the buffer 300 is connected to the eject button (i.e., switch) 20 via a line 332. When the eject button 20 is activated, a low logic level signal (/EJECT) is presented to the input of the buffer 300. When the buffer 300 is activated by an active low /RD signal, a corresponding active low signal is presented to the timer (T1) input of the microprocessor 68. Thus, by activating the /RD signal, the microprocessor 68 can monitor the status of the eject button 20 via the /EJECT signal and can thereby determine when a cartridge is to be ejected from the tape drive.

A fourth output of the buffer 300 is connected to the RXD input of the microprocessor 68 via a signal line 340. The RXD input is a conventional input by which the microprocessor 68 can receive a serial data stream from an external source. The corresponding fourth input to the buffer 300 is connected via a signal line 342 to an input connector 344. A second input connector 346 is connected via a signal line 347 to a fifth output of the buffer 300. A corresponding fifth input of the buffer 300 is connected via a signal line 348 to the TXD output of the microprocessor 68. The microprocessor 68 generates a serial data stream via the TXD output. The microprocessor 68 thus can communicate with an external digital data source (not shown) to receive commands and to transmit status information and other data. These signals can be advantageously used in future embodiments where the present invention is used with a "smart" panel to enable an operator to select the sequence in which cartridges are inserted in the tape drive.

The microprocessor 68 has a second input (T0) which is connected via a pusher position sensor signal line (/PPOS) 350 to the output of a pusher position sensor circuit 352 (FIG. 9b). The input to the pusher position sensor circuit 352 is connected via pusher position sensor input line 354 to the pusher position sensor detector 116b (described above in connection with FIG. 6) which is advantageously a photodetector such as was described above. The pusher position sensor circuit 352 includes a comparator 356 which provides an output signal having a first logic level when the light from the pusher position sensor emitter 116a to the detector 116b is blocked by one of the flags 118 and having a second logic level when the light is not blocked. The pusher position sensor circuit further includes a logic level inverter 358 which inverts the logic level of the output signal from the comparator 356 before presenting it to the pusher position sensor signal line 350. The microprocessor 68 utilizes the logic level on the pusher position sensor signal line 350 as an input to the internal timer connected to the T0 input to monitor the presence or absence of a flag 118 proximate to the pusher position sensor detector 116b. As discussed herein, the timer is used to measure velocity and determine $t_{brake}$ for the pusher motor 94.

The microprocessor 68 has a second conventional interrupt input connection (INT1) to which a magazine position sensor signal line (/MPOS) 360 is connected. The magazine position sensor signal line 360 is connected to the output of a magazine position sensor circuit 362 (FIG. 9b). The input to the magazine position sensor circuit 362 is connected via a magazine position sensor input signal line 364 to the magazine position sensor detector 65b. The magazine position sensor circuit 362 comprises a comparator 366 which provides an output signal having a first logic level when the light from the magazine position sensor emitter 65a to the detector 65b passes through one of the flags 64 (e.g., openings in the opaque strip 62) and having a second logic level when the light is blocked by the opaque strip 62. The magazine position sensor circuit 362 further includes a logic level inverter 368 which inverts the logic level of the output signal from the comparator 366 before presenting it to the magazine position sensor signal line 360. The microprocessor 68 utilizes the logic level on the magazine position sensor signal line 360 as an interrupt input by which it monitors the presence or absence of a flag 64 proximate to the magazine position sensor detector 65b. As discussed herein, the interrupt is used to start and stop an internal timer to measure the velocity of the magazine motor 80 and to determine the desired width of a brake pulse to apply to the magazine motor 80 to stop the motor without reversing its direction.

As illustrated in FIG. 9b, the electronic circuit of the present invention further includes a first motor driver circuit 400. The first motor driver circuit 400 is advantageously an L293D motor driver circuit available from SGS-Thomson Microelectronics, Inc., or the like. The first motor driver circuit 400 provides four output signals (labelled as O1, O2, O3 and O4) that either act as a voltage source (e.g. +12 volts in the preferred embodiment) or act as a current sink (e.g., ground or zero volts in the preferred embodiment) in accordance with the logic level applied to a corresponding input signal (labelled as IN1, IN2, IN3 and IN4, respectively). A first output line 402 is connected from the first output O1 to a first terminal of the pusher motor 94. A second output line 404 is connected from the second output O2 to a second terminal of the pusher motor 94. A third output line 406 is connected from the third output O3 to a first terminal of the magazine motor 80. A fourth output line 408 is connected from the fourth output O4 to a second terminal of the magazine motor 80.

The first motor driver circuit 400 is selectively enabled or disabled by the logic level applied to first and second enable inputs, EN1 and EN2. The two enable inputs are connected to the output of a logic level inverter 410 via a signal line 412. The logic level inverter 410 has its input connected to a motor enable signal (/MEN) line 414 which is connected to the write output (WR) of the microprocessor 68. Thus, when the write output of the microprocessor 68 is active low, the two enable inputs to the first motor driver circuit 400 will be active.

When the first motor driver circuit 400 is activated by the write signal output of the microprocessor 68, the first two outputs, O1 and O2, which correspond to the motor drive circuit 119 of FIG. 6, operate together to drive the pusher motor 94. Similarly, the second two outputs, O3 and O4, which correspond to the motor drive circuit 79 of FIG. 6, operate together to drive the magazine motor 80.

The first input IN1 of the motor drive circuit 400 is connected to a /PA signal line 420 which is connected to the P17 (port 1, bit 7) of the microprocessor 68. The second input IN2 of the motor drive circuit 400 is connected to a /PB signal line 422 which is connected to the P16 (port 1, bit 6). The microprocessor 68 is programmed so that when the first input IN1 has a high logic level applied to it, the second input IN2 will have a low logic level applied to it, and vice versa, when it is desired to drive the pusher motor 94. For example, when the first input IN1 has a high logic level applied to it and the second input IN2 has low logic level applied to it, the first output O1 operates as a voltage source and the second output O2 operates as a current sink to drive the pusher motor 94 in a first direction. When the logic levels are reversed, the pusher motor 94 is driven in the opposite direction. If the two logic levels are the same, or if the first motor driver circuit 400 is not enabled, the pusher motor 94 will not be driven. Thus, by controlling the logic levels on bits 6 and 7 of port 1, in combination with the write signal, the microprocessor 68 can start and stop the pusher motor 94 and control its direction of rotation.

Similarly, the third input IN3 and the fourth input IN4 of the first motor driver circuit 400 are connected via a /MA signal line 430 and a /MB signal line 432, respectively, to the P15 and P14 outputs (port 1, bit 5, and port 1, bit 4), respectively, of the microprocessor 68. The third and a fourth outputs, O3 and O4, are controlled by the logic levels applied to the /MA and /MB signal lines 430, 432 by the microprocessor 68, in combination with the write signal, to start and stop the magazine motor 80 and to control its direction of rotation.

As discussed above, the gripper motor 146 is a stepper motor that operates by rotating in small increments in accordance with a phased voltage applied to its internal windings in a conventional manner. The stepper motor 146 has four terminals that are connected to respective first, second, third and fourth stepper signal lines 440, 442, 444 and 446, which are connected to respective first, second, third and fourth outputs, O1, O2, O3 and O4, of a second motor driver circuit 450, which corresponds to the motor drive circuit 168 of FIG. 6. Similar to the first motor driver circuit 400, the second motor driver circuit 450 is advantageously an L293D circuit from SGS-Thomson Microelectronics, Inc. The first input of the second motor driver circuit 450 is connected to a GA signal line 452 which is connected to the P13 (port 1, bit 3) output of the microprocessor 68. The GA signal line 452 is connected to the input of a logic inverter 454 which provides an inverted GA signal (/GA) on a signal line 456, which is connected to the second input IN2 of the second motor driver circuit 450. The third input IN3 of the second motor driver circuit 450 is connected to a GB signal line 460 which is connected to the P12 (port 1, bit 2) output of the microprocessor 68. The GB signal line 460 is also connected to the input of an inverter 462 which provides an inverted GB signal (/GA) on a signal line 464. The signal line 464 is connected to the fourth input IN4 of the second motor driver circuit 450.

The second motor driver circuit 450 has its two enable inputs, EN1 and EN2, connected to the output of an inverter 470 via a signal line 472. The input of the inverter 470 is connected to a /GPWR signal line 474 which is connected to the P10 (port 1, bit 0) output of the microprocessor 68. The microprocessor 68 controls the operation of the gripper stepper motor 146 in a conventional manner by enabling the P10 output to an active low logic level and then applying logic levels to the GA and GB signal lines in a predetermined phase sequence to step the gripper stepper motor 146 in either a first direction or a second opposite direction. The number and direction of steps is determined by the number and order of phase sequences applied to the gripper stepper motor.

Figure 10:
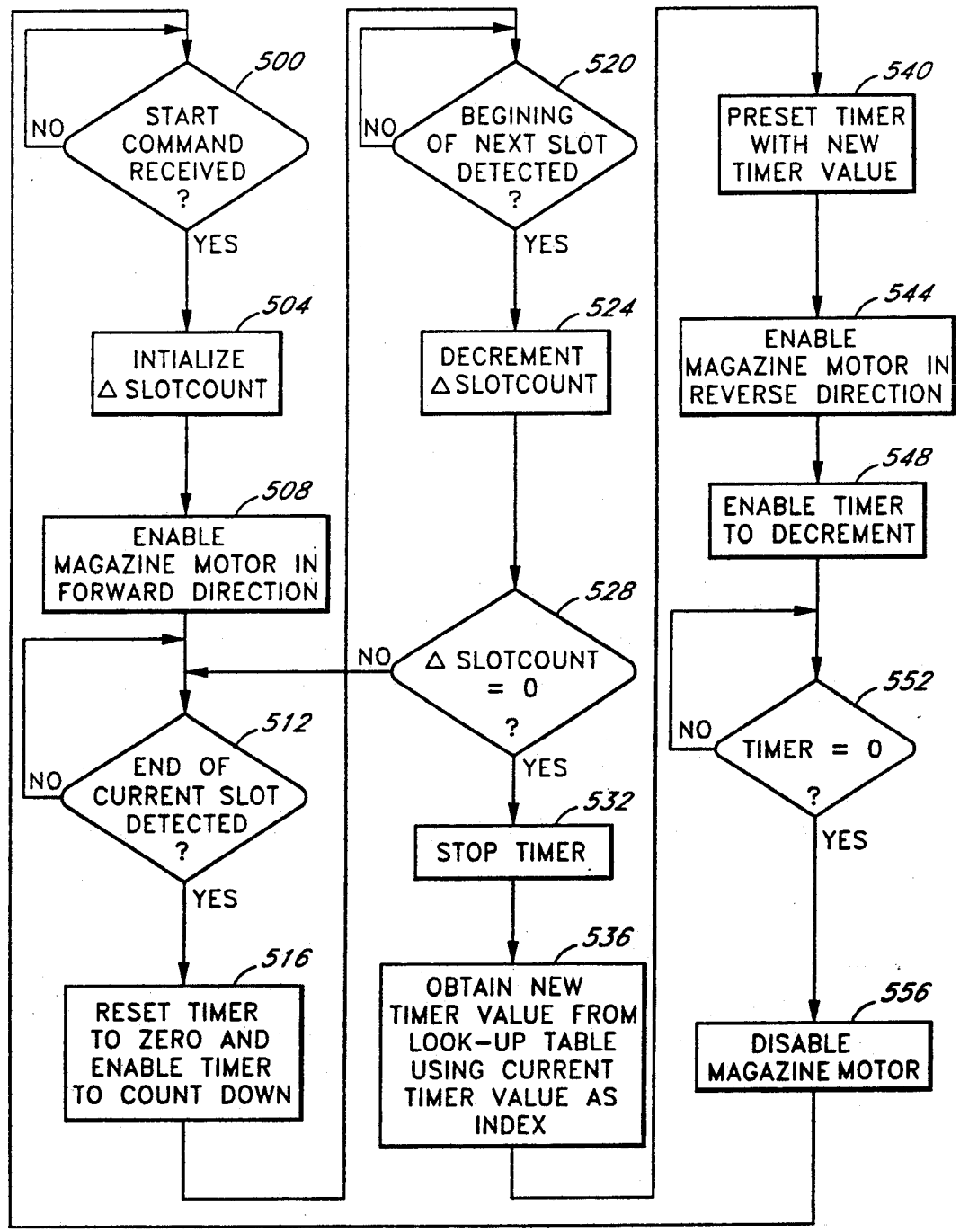
FIG. 10 is a flow chart of an algorithm that controls the movement of the cartridge magazine in accordance with the present invention.

It can be seen from the foregoing how the block diagram of FIG. 6 is implemented by the electronic circuitry of FIGS. 9a, 9b and 9c. The presence of a cartridge is sensed via the cartridge sensing circuit 322. The operation of the magazine motor 80, the pusher motor 94 and the gripper stepper motor 146 can be readily understood by one skilled in the art as applying the appropriate logic level to the first motor driver circuit 400 or the second motor driver circuit 450 when it is desired to move one of the motors in a desired direction. While a motor is operating, the appropriate flag is monitored via the corresponding pusher position sensor circuit 352, magazine position sensor circuit 362 or gripper position sensor circuit 310 to determine when to stop the motor. However, as discussed above, with respect to the pusher motor 94 and the magazine motor 80, it is desirable to stop the respective motor proximate to a particular flag. Thus, for example, with respect to the magazine motor 80, the brake pulse 95 is applied to bring the motor 80 to a complete stop without causing it to reverse direction. FIG. 10 is a flow chart of an exemplary algorithm for determining the length of the brake pulse 95 needed to stop the magazine motor 80 without reversing direction.

The magazine motor control flow chart of FIG. 10 is illustrated as a continuous loop that begins with a decision block 500. In the decision block 500, the microprocessor 68 checks to determine whether it has received a command to move the magazine motor 80 in either the forward or reverse direction (i.e., move the magazine up or down). It should be understood that magazine motor control algorithm is only part of a more complex process wherein the microprocessor 68 is monitoring the various sensors discussed above and may be controlling either the pusher motor 94 or the gripper motor 146 when it is not moving the magazine. If the microprocessor 68 does not receive a command to move the magazine, the magazine motor control algorithm remains at the decision block 500 with respect to the magazine motor control algorithm although the microprocessor 68 may be performing other tasks. With respect to the other decision blocks described hereinafter, the microprocessor 68 may be performing other tasks while it is looping in a decision block in the magazine motor control algorithm.

When the microprocessor 68 receives a command to move the magazine, the microprocessor 68 first enters an activity block 504 wherein it determines how far it must move the magazine 30 (e.g., how many slots to move the magazine). For example, when the magazine 30 is first loaded, the microprocessor 68 will cause the magazine 30 to be moved 5 slots to the lowermost position. On the other hand, when the drive 12 has caused a cartridge to be unloaded, it generally will move the magazine 30 upward only one slot. When the eject button 20 is activated, the microprocessor 68 will respond by moving the magazine 30 upward by the number of slots required to fully eject the magazine 30 from the magazine opening 34. In a programmable embodiment, the number of slots to be moved may be determined by front panel controls. In any case, the microprocessor 68 determines a ΔSLOT COUNT and stores the ΔSLOT COUNT in a variable location within its internal RAM.

Thereafter, the microprocessor 68 enters an activity block 508 wherein it activates the /MEN signal line 414 to enable the first motor driver circuit 400 and applies a high logic level to one of the /MA signal line 420 or the /MB signal line 422 and a low logic level to the other of the two lines to drive the magazine motor 80 in the forward direction. As used herein, the forward direction will be the desired direction of movement of the magazine, whether up or down.

After enabling the magazine motor 80, the microprocessor 68 enters a decision block 512 wherein it monitors the magazine position sensor via the /MPOS line input to the $\overline{INT1}$ input of the microprocessor 68. A change in the condition of this input results in the generation of an internal interrupt to the microprocessor 68 which indicates that the magazine position sensor circuit 362 has detected the beginning or end of a slot 64. The microprocessor 68 waits in the decision block 512 until the interrupt occurs. In this example, it is assumed that the magazine is initially positioned such that a slot 64 is proximate to the magazine position sensor detector 65b so that the first interrupt occurs when the opaque strip 62 blocks the light to the detector 65b. When this occurs, the algorithm enters an activity block 516 wherein one of the internal timers is reset to zero and is enabled to count. For example, the counter may be enabled to increment by one value every 0.1 millisecond (100 microseconds).

After enabling the timer, the algorithm enters a decision block 520 wherein the microprocessor 68 again monitors the output of the magazine position sensor circuit 362 (i.e., waits for another interrupt). When the interrupt occurs to indicate that the beginning of the next slot 64 has been detected, the algorithm enters an activity block 524 wherein the ΔSLOT COUNT value is decremented by one value. Thereafter, the algorithm enters a decision block 528 wherein the current value of the ΔSLOT COUNT is compared to zero to determine whether the magazine has moved the desired number of slots 64. If not, the algorithm returns to the decision block 512 wherein the microprocessor 68 again waits for the end of the current slot 64, then resets and enables the timer in the activity block 516 and then waits for the beginning of the next slot in the decision block 520.

If, in the decision block 528, it is determined that the magazine has moved to the beginning of the desired slot 64, then the algorithm enters an activity block 532 wherein the internal timer is stopped with a value in it proportional to the amount of time required to travel from the end of the previous slot 64 to the beginning of the present slot 64. The distance between the two slots 64 is a known predetermined distance so that the amount of time between the two slots 64 can be used to calculate the average velocity, as discussed above. As discussed above, in the preferred embodiment, the count value in the internal counter is used as an index into the look-up table which is stored in the ROM 90. In an activity block 536, the timer value is used to generate an address to the ROM 90.

In an activity block 540, the timer value from the look-up table is provided as a preset value to the internal timer within the microprocessor 68. For example, each increment in the count value advantageously corresponds to 0.1 millisecond (i.e., 100 microseconds). Thereafter, in an activity block 544, the magazine motor 80 is enabled in the opposite (i.e., reverse direction) by changing the logic levels on the /MA signal line 420 and the /MB signal line 422. The algorithm then enters an activity block 548 wherein the microprocessor 68 enables the internal counter to decrement (i.e., count down toward zero). The algorithm then enters an decision block 552 wherein the microprocessor 68 monitors the internal timer to determine when the internal counter has reached zero. When the microprocessor 68 detects that the internal timer has reached zero, the algorithm enters an activity block 556 wherein the microprocessor 68 disables the magazine motor 80 by applying the same logic level to both the /MA and the /MB signal lines 420 and 422. Thereafter, the algorithm returns to the decision block 500 where it awaits the next command to move the magazine motor 80.

It will be appreciated that certain structural variations may suggest themselves to those skilled in the art. The foregoing detailed description of the preferred embodiments and their operation and method of use is to be clearly understood as given by way of illustration, the spirit and scope of this invention being limited solely by the appended claims.

What is claimed is:

1. A method of moving a magazine having a plurality of slots, each of said slots capable of holding a cartridge, to a specific location so that one of said slots is aligned with an acceptor of a tape drive, comprising the steps of:
    positioning the magazine in a first position where a first flag is proximate to a flag sensor, said first flag being proximate to said flag sensor indicating that a first one of said slots of said magazine is aligned with the acceptor of the tape drive;

enabling a motor in a first direction to move the magazine from said first position to a second position where a second flag is proximate to the flag sensor, said second flag being proximate to said flag sensor indicating that a second one of said slots of said magazine is aligned with the acceptor of the tape drive;

measuring the amount of time required to move the magazine between said first and second positions;

using the measured amount of time to determine the width of a brake pulse to apply to the motor to stop the magazine with the second flag proximate to the flag sensor so that the second cartridge is aligned with the acceptor of the tape drive; and applying the brake pulse to the motor.

2. The method as defined in claim 1, wherein said step of using the measured amount of time to determine the width of a brake pulse comprises applying a digital value corresponding to said measured amount of time to a look-up table which comprises a brake pulse width for each applied digital value.

3. The method of claim 2, wherein the brake pulse widths in said look-up table are calculated using the following equation:

$$t_{brake} = J\omega_{avg}/(2K_TV/R - K_TK_E\omega_{avg}/2R)$$

or an equation which can be derived therefrom.

4. The method as defined in claim 1, wherein the step of applying the brake pulse comprises the step of enabling the motor in a second direction opposite the first direction until the motor stops turning in the first direction and disabling the motor before the motor starts to turn in the second direction.

5. The method of claim 1, wherein the using step results in the second cartridge being aligned within ±1 mm of the acceptor of the drive.

6. The method of claim 1, wherein the brake pulse width is calculated by a microprocessor using the following equation:

$$t_{brake} = J\omega_{avg}/(2K_TV/R - K_TK_E\omega_{avg}/2R)$$

or an equation which can be derived therefrom.

7. A cartridge loader for a drive having a cartridge acceptor, comprising:

a housing having a conduit extending therethrough;

a magazine movably mounted through said conduit, said magazine defining a plurality of spaces, each of said spaces sized and shaped to receive a cartridge;

a plurality of flags on said magazine, each of said flags corresponding to one of said spaces and providing an indication sensed by a magazine sensor that one of said spaces is aligned with said cartridge acceptor;

a magazine sensor mounted in said housing, said sensor being capable of detecting the presence of one of said flags at a time, the presence of one of said flags indicating that the space corresponding to said flag is aligned with said acceptor;

a linear displacement assembly for reversibly moving said magazine within said conduit, said linear displacement assembly under the control of a magazine drive circuit; and a timer that is part of said magazine drive circuit which can indicate the length of time taken for the linear displacement assembly to move the magazine from a first position in which a first of said flags is proximate said sensor to a second portion where a second of said flags is proximate to said sensor, wherein said length of time is used to determine the width of a brake pulse to be applied to said magazine in order to accurately stop said magazine with one of said spaces aligned with said cartridge acceptor.

8. The loader of claim 7, additionally comprising a data storage device containing a look-up table having values for a length of a brake pulse to be applied to said magazine based on the length of time calculated by said timer.

9. The loader of claim 7, wherein said magazine comprises a flange made of opaque material along a side thereof and wherein said flags comprise cut-outs in said flag.

10. The loader of claim 7, additionally comprising a microprocessor which can calculate a length of a brake pulse according to the following equation:

$$t_{brake} = J\omega_{avg}/(2K_TV/R - K_TK_E\omega_{avg}/2R)$$

or an equation which can be derived therefrom.

11. The loader of claim 7, additionally comprising a pusher supported by said housing for pushing a cartridge positioned within one of said plurality of said spaces to said acceptor of said drive so that said acceptor accepts said cartridge, said pusher being driven by a pusher drive system which propels said pusher from a first position not touching said cartridge to a second position in contact with said cartridge.

12. The loader of claim 11, additionally comprising a gripper having a hook thereon for gripping a cartridge upon ejection of said cartridge by said acceptor, said gripper being movable by said pusher to position said cartridge within one of said plurality of spaces.

13. The loader of claim 7, wherein said housing has at least one open end, wherein said drive has an exposed space on at least one side within which said cartridge acceptor is located, and wherein said open end of said housing is mounted to said exposed space of said drive and said housing projects away from said drive.

* * * * *